(12) United States Patent
Yamamura

(10) Patent No.: US 7,957,067 B2
(45) Date of Patent: Jun. 7, 2011

(54) LENS ARRAY, LED HEAD, EXPOSURE DEVICE, IMAGE FORMING APPARATUS AND READING APPARATUS

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 46 days.

(21) Appl. No.: 12/458,015

(22) Filed: Jun. 29, 2009

(65) Prior Publication Data

US 2010/0002307 A1 Jan. 7, 2010

(30) Foreign Application Priority Data

Jul. 1, 2008 (JP) .................................. 2008-172823

(51) Int. Cl.
*G02B 27/10* (2006.01)
*G02B 9/04* (2006.01)
(52) U.S. Cl. ..................... 359/622; 359/738; 359/621
(58) Field of Classification Search .................. 347/241; 359/614, 620, 621, 622, 738; 399/218
See application file for complete search history.

(56) References Cited

U.S. PATENT DOCUMENTS

| | | | |
|---|---|---|---|
| 5,796,522 A * | 8/1998 | Meyers | 359/626 |
| 6,707,613 B2 * | 3/2004 | Fujimoto et al. | 359/622 |
| 2010/0157429 A1 * | 6/2010 | Yamamura | 359/622 |

FOREIGN PATENT DOCUMENTS

| | | |
|---|---|---|
| JP | 10-210213 A | 8/1998 |
| JP | 2005-122041 | 5/2005 |
| JP | 2008-087185 A | 4/2008 |

* cited by examiner

*Primary Examiner* — David N Spector
(74) *Attorney, Agent, or Firm* — Rabin & Berdo, PC

(57) ABSTRACT

A lens array includes a plurality of lens units each of which includes a plurality of microlenses linearly arranged, and a light shielding member having a plurality of openings as apertures. The openings are disposed so as to face the microlenses of respective lens units. Facing microlenses of the lens units have optical axes substantially aligned with each other and passing the openings of the light shielding member. Light absorbing portions are provided in the openings.

45 Claims, 16 Drawing Sheets

FIG.11A
FIG.11B
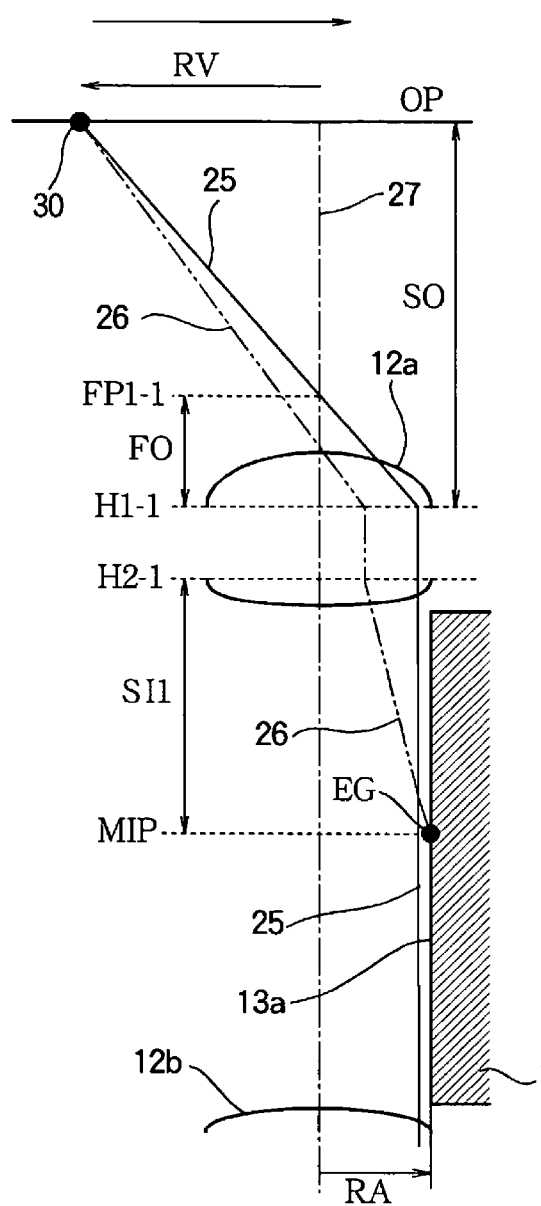
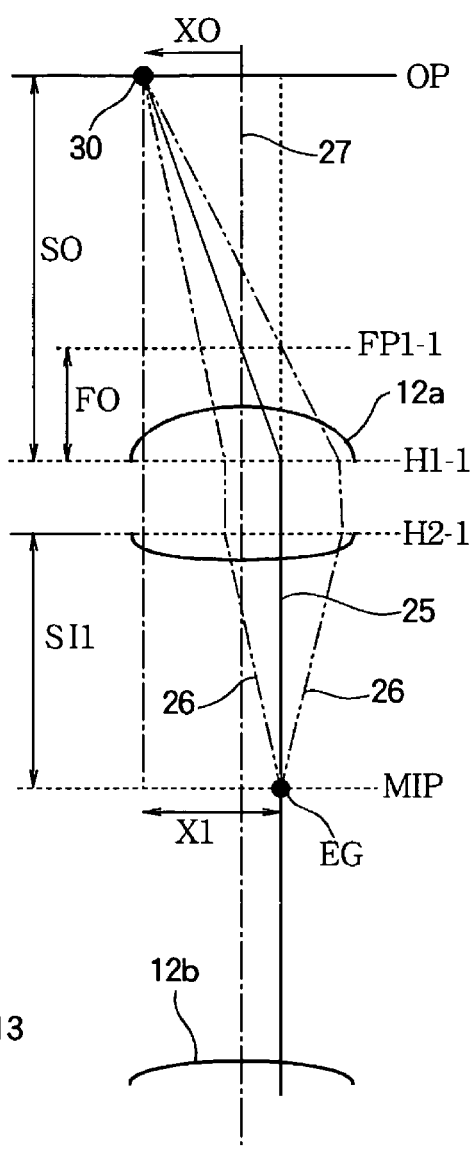

FIG.12A
FIG.12B
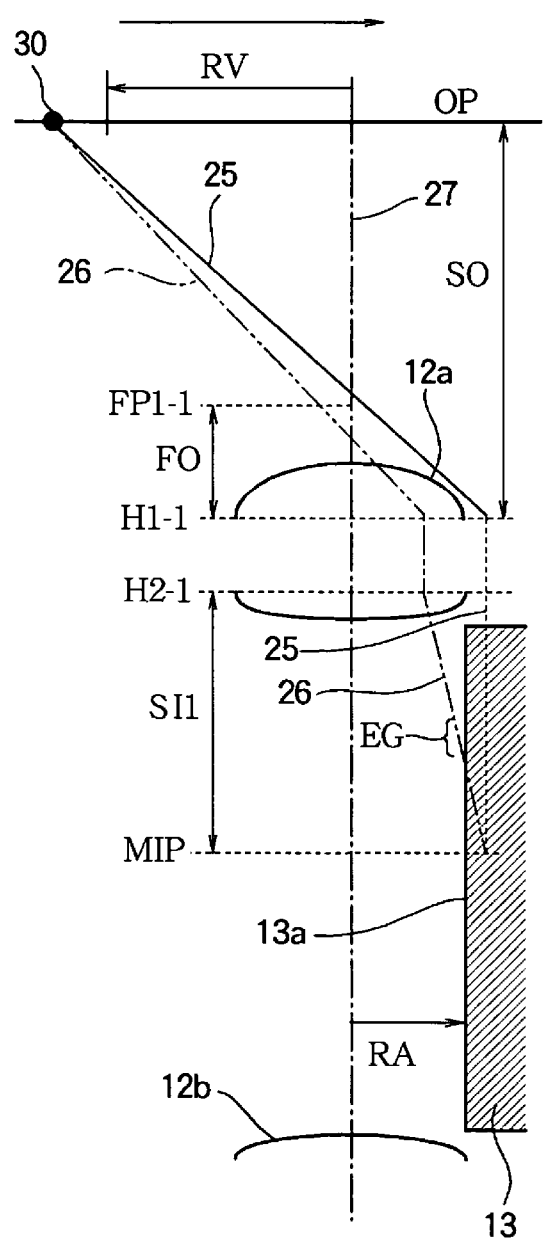
LENS ARRANGING DIRECTION
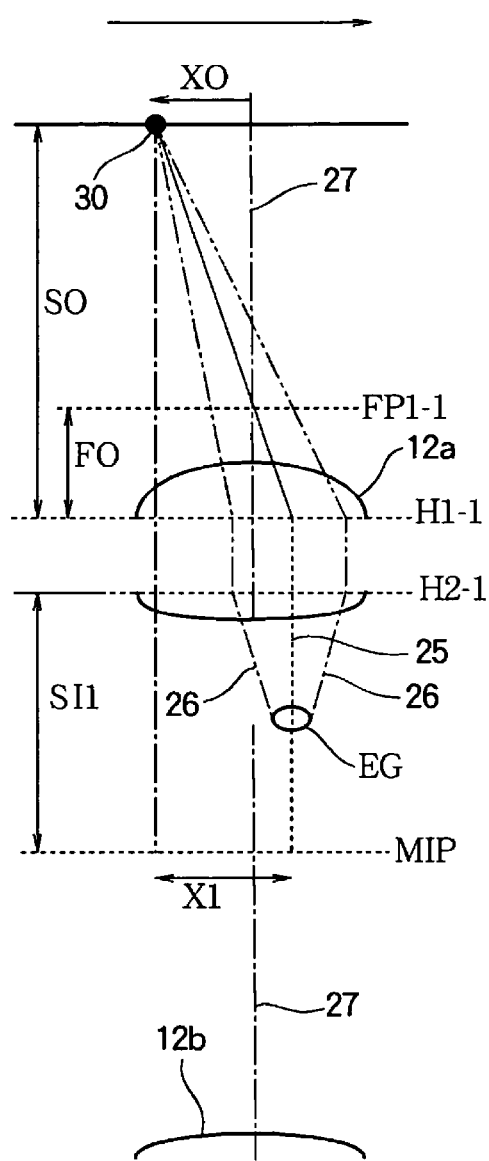
LENS ARRAY WIDTH DIRECTION

LENS ARRAY, LED HEAD, EXPOSURE DEVICE, IMAGE FORMING APPARATUS AND READING APPARATUS

BACKGROUND OF THE INVENTION

The present invention relates to a lens array used in an image forming apparatus, a reading apparatus or the like. The present invention also relates to an exposure device using the lens array, and an LED head using the exposure device. The present invention also relates to an image forming apparatus and a reading apparatus using the lens array.

There are known an image forming apparatus having an LED head in which a plurality of LEDs (light emitting diodes) are arranged in an array, and a reading apparatus (such as a scanner or a facsimile machine) having a light receiving portion in which a plurality of light receiving elements are arranged in an array. Such an apparatus uses a rod lens array as an optical system that forms an erected image of an object at 1:1 magnification in the form of a line. In this regard, it is proposed to provide a light shielding member between adjacent lens elements of the rod lens array (see, for example, Japanese Laid-Open Patent Publication No. 2005-122041).

Further, there is known a lens array including a plurality of microlenses arranged in an array, which forms an elected image of an object at a magnification of 1:1 in the form of a line. The lens array with the microlenses can be efficiently formed with high form accuracy using plastic injection molding, and therefore a high resolution can be obtained.

However, when the conventional lens array is used, a phenomenon (called a flare) where a light from an object reaches an imaging plane without being collected may occur. In such a case, a sufficient resolution can not be obtained.

SUMMARY OF THE INVENTION

The present invention is intended to provide a lens array capable of preventing a flare, and to provide an LED head, an exposure device, an image forming apparatus and a reading apparatus using the lens array.

The present invention provides a lens array including a plurality of lens units each of which includes a plurality of microlenses linearly arranged, and a light shielding member having a plurality of openings as apertures. The openings are disposed so as to face the microlenses of respective lens units. Facing microlenses of the lens units have optical axes substantially aligned with each other and passing the openings of the light shielding member. Light absorbing portions are provided in the openings.

With such a configuration, a flare (i.e., a phenomenon where a light from an object reaches an imaging plane without being collected) can be prevented by the light absorbing portions provided in the openings of the light shielding member, and therefore a resolution of the lens array can be enhanced.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIGS. 11A and 11B are schematics view for illustrating a degradation of resolution of the microlens;

FIGS. 12A and 12B are schematic views for illustrating a degradation of resolution of the microlens;

DETAILED DESCRIPTION OF THE PREFERRED EMBODIMENT

Hereinafter, embodiments of the present invention will be described with reference to the attached drawings. In this regard, the present invention is not limited to the embodiments, but can be modified without departing from the scope of the invention.

Embodiment 1

Figure 1:
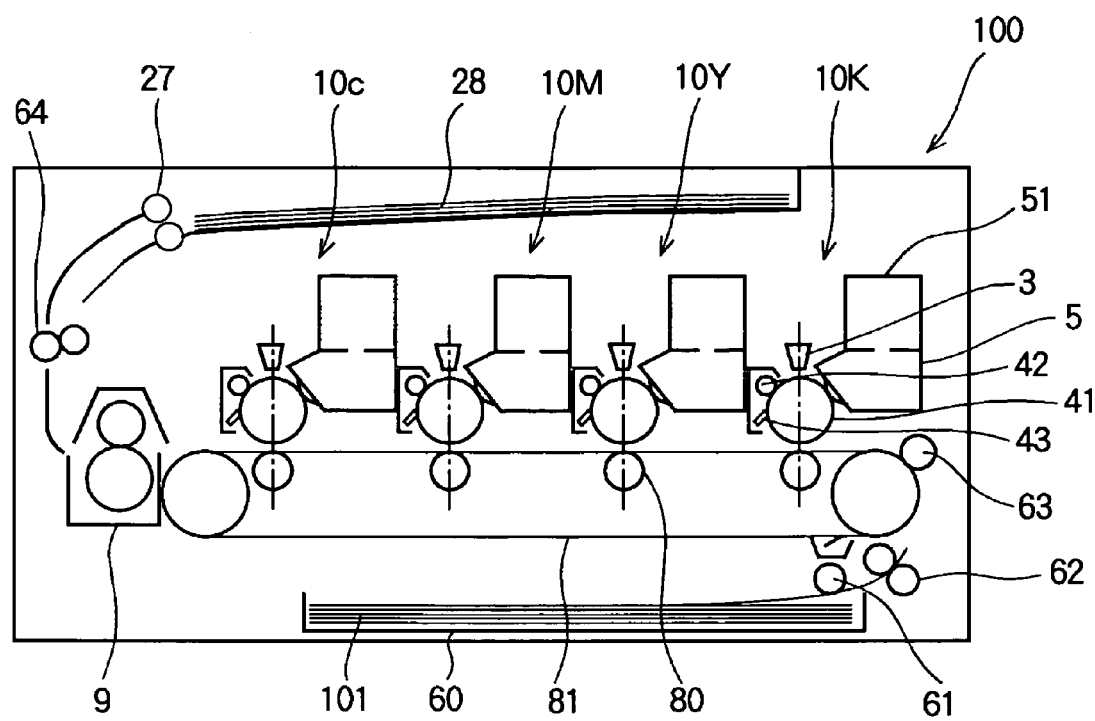
FIG. 1 is a side view schematically showing a configuration of an electrophotographic printer as an image forming apparatus according to Embodiment 1 of the present invention.

FIG. 1 is a side view schematically showing an electrophotographic printer as an image forming apparatus according to Embodiment 1 of the present invention. First, description will be made of a configuration of the electrophotographic printer.

In FIG. 1, the electrophotographic printer 100 (hereinafter, simply referred to as a printer) is configured to form an image on a printing medium based on image data using a toner containing pigment as a coloring agent. The printer 100 includes a sheet cassette 60 in which sheets 101 (as printing media) are stored, a feeding roller 101 that feeds the sheet 101 out of the sheet cassette 60 and carrying rollers 62 and 63 that carry the sheet 101 along a sheet feeding path.

The printer 100 of Embodiment 1 is a color electrophotographic printer, and includes image forming portions 10K, 10Y, 10M and 10C for forming images of black, yellow, magenta and cyan. The image forming portions 10K, 10Y, 10M and 10C have the same configurations. Each of the image forming portions 10K, 10Y, 10M and 10C includes a photosensitive drum 41 as a latent image bearing body, a charging roller 42 that applies electric charge to the surface of the photosensitive drum 41 to uniformly charge the surface of the photosensitive drum 41, an LED head 3 as an exposure device that exposes the surface of the photosensitive drum 41 based on image data to form a latent image, and a developing unit 5 that develops the latent image on the photosensitive drum 41 using the toner to form a toner image. The image forming portion further includes a toner cartridge 51 that supplies a toner to the developing unit 5, a transfer roller 80 that transfers the toner image on the photosensitive drum 41 to the sheet 101, and a cleaning blade 43 that removes the residual toner remaining on the surface of the photosensitive drum 41 after the toner passes the transfer roller 80.

A transfer belt 81 for carrying the sheet 101 is disposed below the image forming portions 10K, 10Y, 10M and 10C. A fixing unit 9 is disposed on the downstream side (i.e., the left side in FIG. 1) of the image forming portions 10K, 10Y, 10M and 10C. The fixing unit 9 fixes the toner image to the sheet 101 by applying heat and pressure. Carrying rollers 64 are disposed on the downstream side of the fixing unit 9, which carry the sheet 101 having passed the fixing unit 9. Ejection rollers 27 are disposed on the downstream side of the carrying rollers 64, which eject the sheet 101 (on which the image has been fixed) to a stacker portion 28 for stacking the sheets 101.

The charging roller 42 and the transfer roller 80 are applied with predetermined voltages by not shown power sources. The transfer belt 81, the photosensitive drum 7 and the respective rollers are driven by not shown motors and gears that transmit the driving force of the motors. The developing unit 5, the LED head 3, the fixing unit 9 and not shown motors are connected with power sources and a control unit. The printer 100 further includes an external interface for communication with external devices and for receiving print data, and the control unit that receives the print data via the external interface and controls an entire operation of the printer 100.

Figure 2:
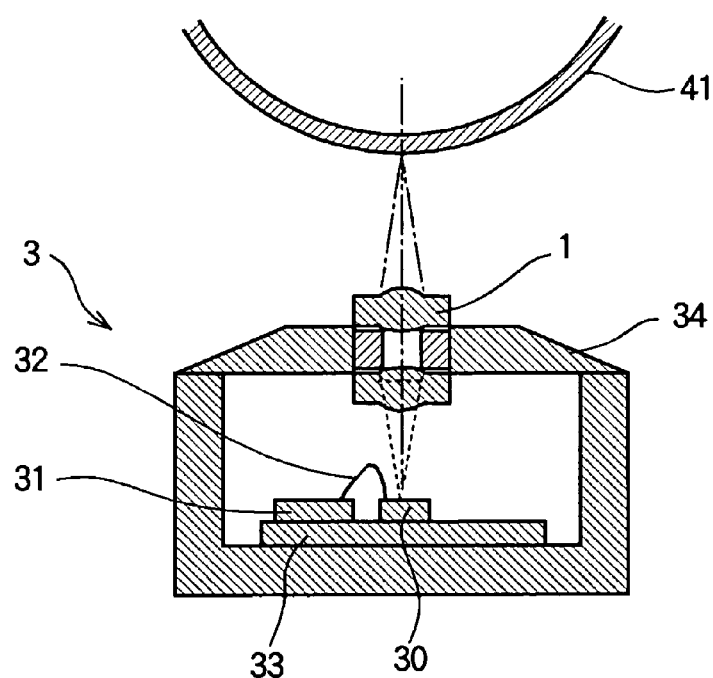
FIG. 2 is a sectional view schematically showing an LED head as an exposure device according to Embodiment 1.

Next, a configuration of an LED head according to Embodiment 1 of the present invention will be described. FIG. 2 is a sectional view schematically showing the LED head 3 as the exposure device. In FIG. 2, the LED head 3 has a lens array 1. The lens array 1 is fixed to a holder 34. A reference numeral 30 indicates LED elements as a light emitting portion. A driver IC 31 id provided for controlling light emission of the LED elements 30. The LED elements 30 and the driver IC 31 are disposed on a circuit board 33 held by the holder 34. The LED elements 30 are linearly arranged in a row with an arranging interval PD (mm). The arranging direction of the LED elements 30 is parallel to a rotation axis of the photosensitive drum 41. The LED elements 30 and the driver IC 31 are connected to each other using wires 32.

In this embodiment, the LED head 3 has a resolution of 600 dpi (dots per inch). In other words, 600 LED elements 30 are arranged per inch (1 inch is approximately 25.4 mm). Therefore, the arranging interval PD of the LED elements 30 is 0.0423 mm.

Figure 3:
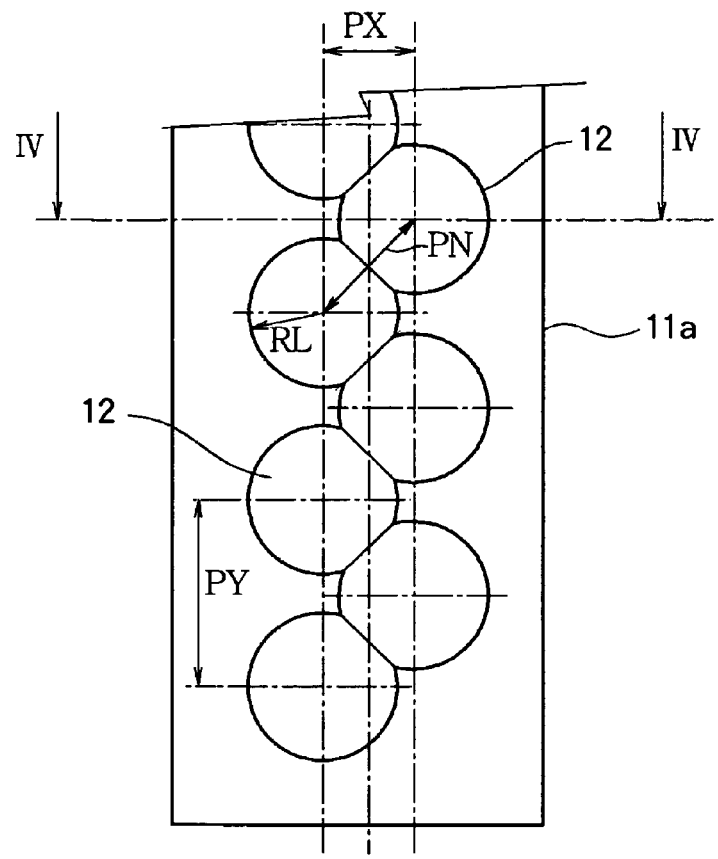
FIG. 3 is a plan view showing a lens array according to Embodiment 1.
Figure 4:
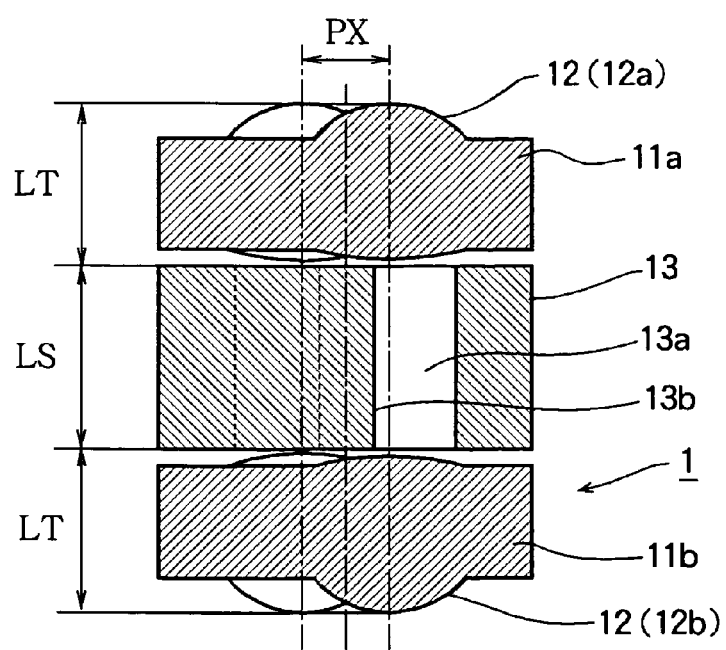
FIG. 4 is a sectional view showing the lens array according to Embodiment 1.
Figure 14:
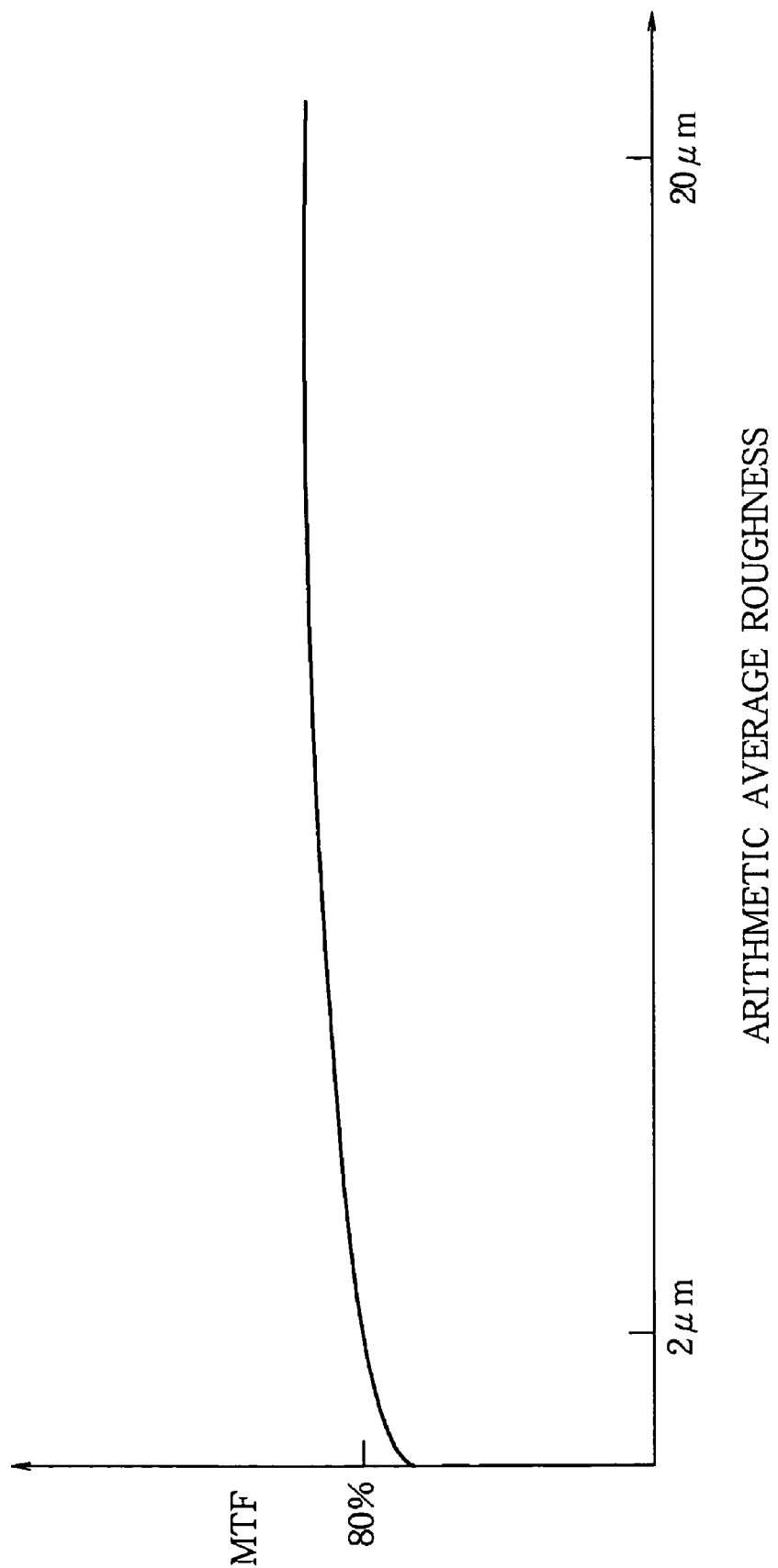
FIG. 14 shows a relationship between the arithmetic average roughness of the light absorbing portion and an MTF of the lens array.

Next, the lens array 1 according to Embodiment 1 will be described. FIG. 3 is a plan view showing the lens array 1 according to Embodiment 1. FIG. 4 is a sectional view showing the lens array 1 taken along Line IV-IV in FIG. 3. In FIGS. 3 and 4, the lens array 1 includes two lens plates 11a and 11b (i.e., lens units) and a light shielding member 13. As shown in FIG. 14, optical axes of lens elements of the lens plate 11a are substantially aligned with optical axes of lens elements of the lens plate 11b. Further, the light shielding member 13 is inserted between the lens plates 11a and 11b.

As shown in FIG. 3, the lens plate 11a includes a plurality of microlenses 12 arranged in two rows. The microlenses 12 are arranged at intervals PY (i.e., arranging intervals) in each row. An interval between two rows (in a direction perpendicular to the arranging direction of the microlenses 12) is expressed as PX. In this embodiment, PX<PY is satisfied. A radius of the microlens 12 is expressed as RL. A center-to-center distance between one microlens 12 of one row and the closest microlens 12 of the other row is expressed as PN. The microlenses 12 are so disposed that the microlenses 12 of the adjacent rows partially overlap with each other. That is, PN<2RL is satisfied. As shown in FIG. 4, a distance between surfaces of each microlens 12 in a direction of the optical axis (i.e., a distance between apexes of curved surfaces of each microlens 12) is expressed as LT. The lens plate 11a is composed of a material that transmits a light emitted from the light emitting portion (i.e., the LED elements 30).

Figure 5:
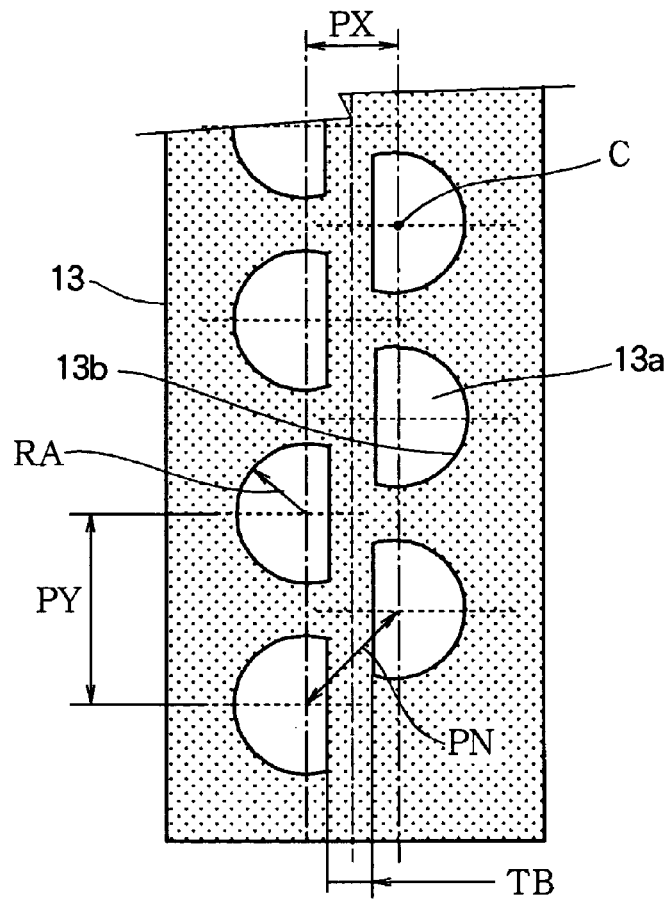
FIG. 5 is a plan view showing a light shielding member according to Embodiment 1.

FIG. 5 is a plan view showing the light shielding member 13. In FIGS. 4 and 5, the light shielding member 13 is composed of a material that blocks the light emitted from the light emitting portion. The light shielding member 13 has openings 13a of a substantially cylindrical shape. An inner wall of each opening 13a has a predetermined arithmetic average roughness as measured in a direction parallel to the optical axes of the microlenses 12 using a method defined by JIS (Japanese Industrial Standard) B0601-1994.

Figure 6:
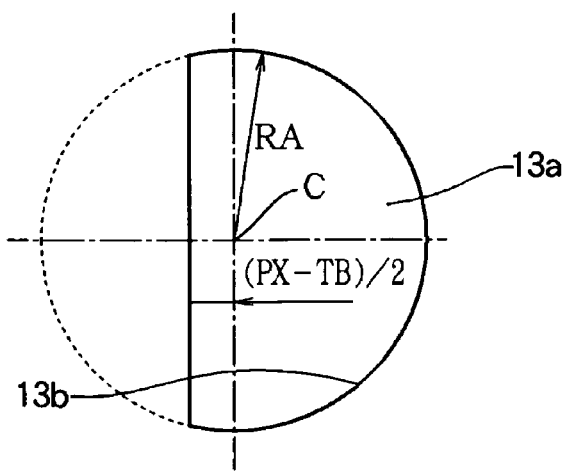
FIG. 6 is a plan view showing an opening of the light shielding member according to Embodiment 1.

FIG. 6 is a plan view showing a shape of the opening 13a. The opening 13a has a cylindrical shape having a radius RA which is cut by a plane substantially parallel to a center axis C of the cylindrical shape at a distance of (PX−TB)/2 from the center axis C. As shown in FIG. 5, "TB" represents an interval between the openings 13a of two rows (in the direction perpendicular to the arranging direction of the openings 13a in each row). The arranging interval of the openings 13a in each row is substantially the same as the arranging interval PY of the microlenses 12 (FIG. 3). An interval between two rows of the openings 13a is the same as the interval PX of two rows of the microlenses 12 (FIG. 3). Further, the center axes C (FIG. 6) of the openings 13a are substantially aligned with optical axes of the microlenses 12. The light shielding member 13 has a length LS in the direction of the optical axes of the microlenses 12 as shown in FIG. 4.

The lens plates 11a and 11b are composed of optical plastic of cyclo-olefin polymer ("ZEONEX E48R" manufactured by ZEON Corp.). Each of the lens plates 11a and 11b is formed as an integral body with a plurality of microlenses 12 using an injection molding. A curved surface of each microlens 12 is a rotationally symmetrical high-order aspheric surface expressed by the following equation (1) so as to obtain high resolution:

$$z(r) = \frac{\frac{r^2}{C}}{1 + \sqrt{1 - \left(\frac{r}{C}\right)^2}} + Ar^4 + Br^6 \qquad (1)$$

In the equation (1), the function "z(r)" represents a rotational coordinate whose center axis is defined in substantially parallel to the optical axis of the microlens 12, and "r" represents a coordinate in a radial direction. The apex of the curved surface of the microlens 12 is a point of origin. The direction from an object plane toward an imaging plane of the lens array 12 is expressed by positive value. "C" represents a radius of curvature, "A" represents a fourth-order aspheric coefficient, and "B" represents a sixth-order aspheric coefficient.

The light shielding member 13 is formed by adding 67 weight parts of glass fibers (each of which has a length of 50 μm and a diameter of 10 μm) to 100 weight parts of polyphenylene sulfide (PPS) and by the injection molding. The inner surfaces of the openings 13a function as light absorbing portions 13b in this embodiment. The inner surface of each opening 13a has an arithmetic average roughness of 5 μm as measured in the direction substantially parallel to the optical axes of the microlenses 12 based on Japanese Industrial Standard JIS B0601-1994.

Figure 7:
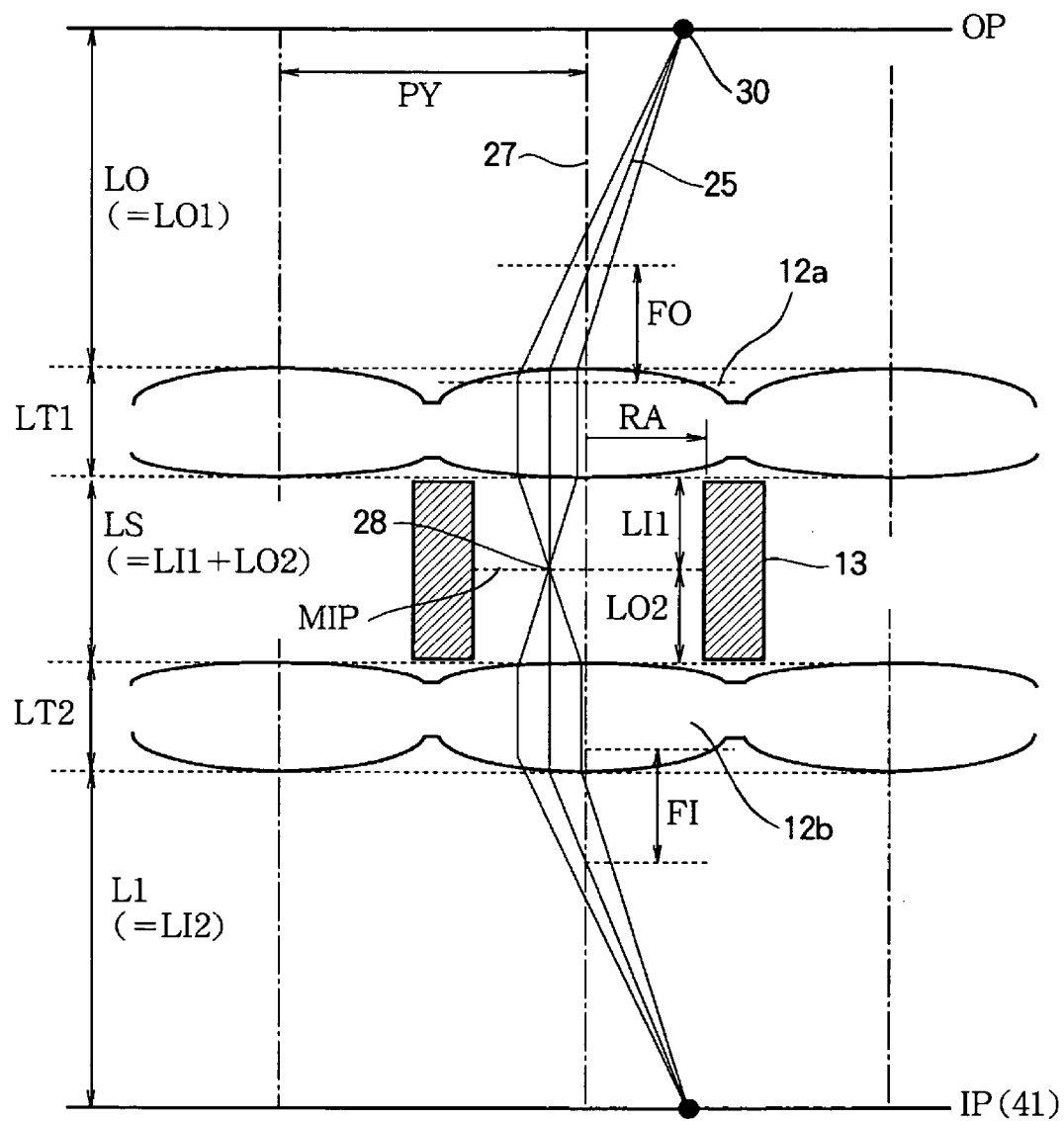
FIG. 7 is a sectional view showing the lens array according to Embodiment 1.

The configuration of the lens array 1 will be described with reference to FIG. 7. FIG. 7 is a sectional view of the lens array 1 cut by a plane including the optical axes of the microlenses 12 and substantially parallel to the arranging direction of the microlenses 12. In FIG. 7, a left-right direction is parallel to the arranging direction of the microlenses 12. The first microlenses 12a (i.e., microlenses 12 of the lens plate 11a) are disposed at a distance LO from the object plane OP of the lens array 1. The second microlenses 12b (i.e., microlenses 12 of the lens plate 11b) are disposed facing the first microlenses 12a so that optical axes of the second microlenses 12b are aligned with optical axes of the first microlenses 12a, and are disposed at a distance LS from the first microlenses 12a. An imaging plane IP of the lens array 1 is defined at a distance L from the second microlenses 12b in the direction of the optical axes of the microlenses 12b.

The first microlens 12a has a thickness LT1 and a front focal length FO. The first microlens 12a focuses an image of an object (at a distance LO1 from the first microlenses 12a) on a plane at a distance LI1 from the first microlens 12a in the direction of the optical axis. The second microlens 12b has a thickness LT2 and a back focal length FI. The second microlens 12b focuses an image of an object (at a distance LO2 from the first microlenses 12b) on a plane at a distance LI2 from the second microlens 12b in the direction of the optical axis.

The distance LO from the object plane OP of the lens array 1 to the first microlenses 12a is set to be the same as LO1. The distance LS between the first and second microlenses 12a and 12b is set to the same as the sum of the distances LI1 and LO2 (i.e., LS=LI1+LO2). The distance LI from the second microlens 12b to the imaging plane IP of the lens array 1 is set to be the same as LI2.

The first microlens 12a and the second microlens 12b can be formed to have the same configurations. In such a case, each of the microlenses 12a and 12b has the thickness LT1 and the front focal length FO. When each of the microlenses 12a and 12b focuses an image of the object at a distance LO1 on a plane at a distance LI1 in the direction of the optical axis, the distance LO from the object plane OP of the lens array 1 to the first microlens 12a is set to be the same as the distance LO1, and the distance LS between the first and second microlenses 12a and 12b is set to be the same as double the thickness LI1 (LS=2×LI1). Further, the first and second lenses 12a and 12b are disposed facing each other so that the curved surface of the second microlens 12b on the imaging plane IP side has the same shape as the curved surface of the first microlens 12a on the object plane OP side. The distance from the second microlens 12b to the imaging plane IP of the lens array 1 is set to be same as the distance LO1 (i.e., LI=LO).

Next, operations according to the Embodiment 1 will be described. First, an operation of the electrophotographic printer 100 as an image forming apparatus will be described with reference to FIG. 1.

In FIG. 1, when a printing operation is initiated, the surface of the photosensitive drum 41 is uniformly charged by the charging roller 42 which is applied with a voltage by a not shown power source. When the charged surface of the photosensitive drum 41 reaches a position facing the LED head 3 by the rotation of the photosensitive drum 41, the surface of the photosensitive drum 41 is exposed to the light emitted by the LED head 3, so that a latent image is formed thereon. The latent image is developed by the developing unit 5, so that a toner image is formed on the photosensitive drum 41.

The sheet 101 stored in the sheet cassette 60 is fed out of the sheet cassette 60 by the feeding roller 61, and carried by the carrying rollers 62 and 63 to the vicinity of the transfer roller 80 and the transfer belt 81. When the toner image on the surface of the photosensitive drum 41 reaches to the vicinity of the transfer roller 80 and the transfer belt 81 by the rotation of the photosensitive drum 41, the toner image is transferred to the sheet 101 by the transfer roller 80 and the transfer belt 81 applied with voltages by a not shown power source.

Toner images of respective colors are transferred to the sheet 101 at the respective image forming portions 10K, 10Y, 10M and 10C, and the sheet 101 is fed to the fixing unit 9 by the rotating transfer belt 81. The fixing unit 9 applies heat and pressure to the toner image, so that the toner image is molten and is fixed to the sheet 101. Further, the sheet 101 is fed by the carrying rollers 64 and the ejection rollers 27 to the stacker portion 28, and the printing operation of the electrophotographic printer 100 is completed.

Next, an operation of the exposure device 3 according to Embodiment 1 will be described with reference FIG. 2. In FIG. 2, the control unit (not shown) of the electrophotographic printer 100 sends a control signal to the driver IC 31 according to the image data. Based on the control signal, the driver IC 31 drives the LED elements 30 to emit lights. The lights emitted by the LED elements 30 are incident on the lens array 1, and are focused onto the surface of the photosensitive drum 41.

Next, an operation of the lens array 1 will be described with reference to FIG. 7. In FIG. 7, the light emitted by the LED element 30 is incident on the first microlens 12a. The first microlens 12a forms an intermediate image 28 on an intermediate imaging plane MIP at a distance LI1 from the first microlens 12a in the direction of the optical axis 27. Further, the second microlens 12b forms an image of the intermediate image 28, with the result that the image of the LED element 30 is formed on the imaging plane IP. The intermediate image 28 is an inverted and reduced image of the LED element 30. The image formed on the imaging plane IP is an inverted and enlarged image of the intermediate image 28. Between the first and second microlenses 12a and 12b, principal rays of lights from respective points on the object plane OP are substantially parallel to each other (i.e., telecentric). With such a configuration, the lens array 1 forms an erected image of the LED element 30 at the magnification of 1:1. Among the lights emitted by the LED elements 30, non-image forming lights (that do not contribute to formation of an image) are blocked by the light shielding member 13.

In this regard, even when the first microlens 12a and the second microlens 12b have the same configurations, the lens array 1 forms an erected image of the LED element 30 at the magnification of 1:1. In this case, the light emitted by the LED element 30 is incident on the first microlens 12a, and the first microlens 12a forms the intermediate image on the intermediate imaging plane MIP at a distance LS/2 from the first microlens 12a in the direction of the optical axis 27. The second microlens 12b forms the image of the intermediate image 28, with the result that the image of the LED element 30 is formed on the imaging plane IP. Between the first and second microlenses 12a and 12b, principal rays of the lights from respective points on the object plane OP are substantially parallel to each other (i.e., telecentric).

Figure 8:
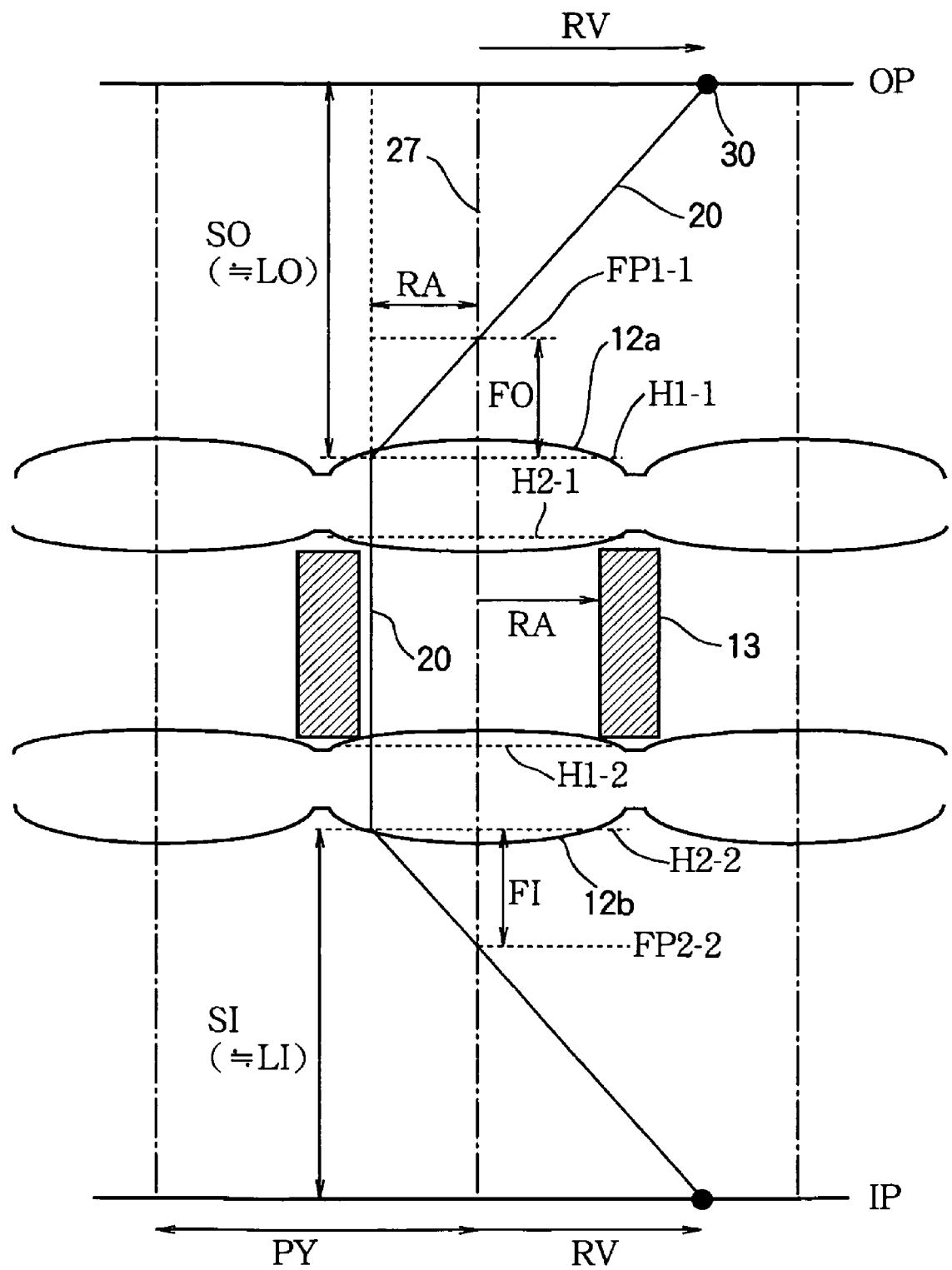
FIG. 8 is a schematic view for illustrating optical characteristics of microlenses of the lens array according to Embodiment 1.

Next, optical properties of the microlens 12 will be described with reference to FIG. 8. FIG. 8 is a sectional view of the lens array 1 cut by a plane including the optical axes of the microlenses 12 and parallel to the arranging direction of the microlenses 12. In FIG. 8, a left-right direction is parallel to the arranging direction of the microlenses 12. A distance from a first principal plane H1-1 to a first focal plane FP1-1 of the first microlens 12a is FO (i.e., the front focal length FO). A distance from the first principal plane H1-1 to the object plane OP is expressed as SO. A distance from a second principal plane H2-2 to a second focal plane FP2-2 of the second microlens 12b is FI (i.e., the back focal length FI). A distance from the second principal plane H2-2 to the imaging plane IP is expressed as SI.

Here, a difference between the distance SO and the distance LO is inversely proportional to a radius of curvature of a curved surface of the first microlens 12a on the object plane OP side. Further, a difference between the distance SI and the distance LI is inversely proportional to a radius of curvature of a curved surface of the second microlens 12b on the imaging plane IP side. In the lens array 1 of Embodiment 1, radii of curvatures of the respective curved surfaces of the microlenses 12 are very large, so that the difference between the distances SO and LO and the difference between the distances SI and LI are negligible. Therefore, it can be understood that the distance SO is almost the same as the distance LO (i.e., SO≈LO), and the distance SI is almost the same as the distance LI (i.e., SI≈LI).

Further, principal light rays from respective points on the object plane OP are substantially parallel to the optical axis 27 between the first and second microlenses 12a and 12b. In particular, peripheral light rays of the light ray 20 passing the vicinity of the inner surface of the opening 13a of the light shielding member 13 are blocked. Based on a similarity relationship of figures (i.e., two triangles) formed by the optical axis 27, the light ray 20, the object plane OP and the first principal plane H1-1 of the first microlens 12a, a radius RV of a viewing field of the first microlens 12a is expressed as the following equation (2):

$$RV = RA \times \frac{LO - FO}{FO} \quad (2)$$

where RA represents a maximum distance from the optical axis 27 of the microlens 12 to the inner surface of the opening 13a of the light shielding member 13.

Figure 9:
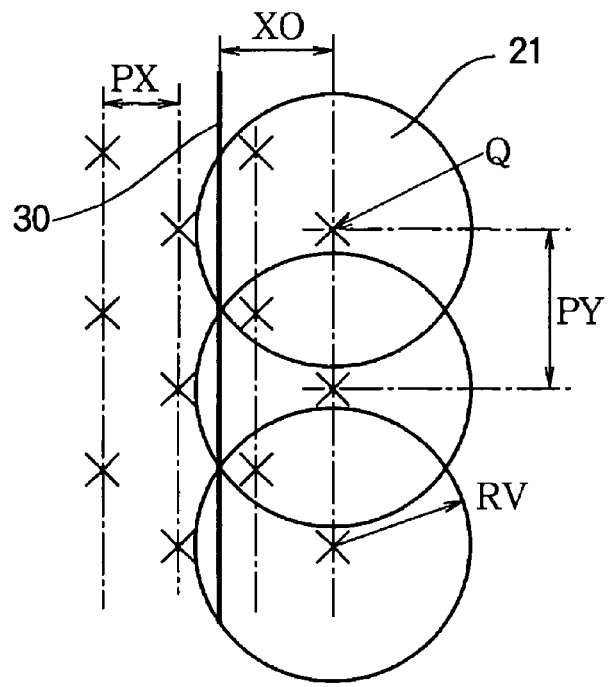
FIG. 9 is a plan view showing a viewing field of the microlenses according to Embodiment 1.

Next, a relationship between the arrangement of the microlenses 12 and the radius RV of viewing field will be described with reference to FIG. 9. FIG. 9 shows viewing fields of the microlenses 12, and schematically shows a positional relationship between the LED elements 30 and the optical axes of the microlenses 12 arranged in a plurality of arrays. FIG. 9 shows the smallest radii RV of the viewing fields of the microlenses 12 in the case where each of the LED elements 30 is disposed in the viewing field of at least one microlens 12 of the same row. In FIG. 9, marks Q indicate intersections between the object plane OP and the optical axes of the microlenses 12. In FIG. 9, the radius RV of the viewing field 21 of the microlens 12 is expressed by the following equation (3):

$$RV = \sqrt{(XO)^2 + \left(\frac{PY}{2}\right)^2} \quad (3)$$

where XO represents a distance from the LED element 30 to the optical axis of the microlens 12 in the direction substantially perpendicular to the arranging direction of the microlenses 12.

Based on the equations (2) and (3), an operating condition of the lens array 1 is expressed as the following equation (4):

$$\sqrt{(XO)^2 + \left(\frac{PY}{2}\right)^2} \leq RA \times \frac{LO - FO}{FO} \quad (4)$$

where FO represents the focal length of the microlens 12, LO represents a distance from the lens array 1 to the object plane OP of the lens array 1, and RA represents a maximum distance from the optical axis of the microlens 12 to the inner surface of the opening 13a of the light shielding member 13 (see FIG. 8).

Figure 10:
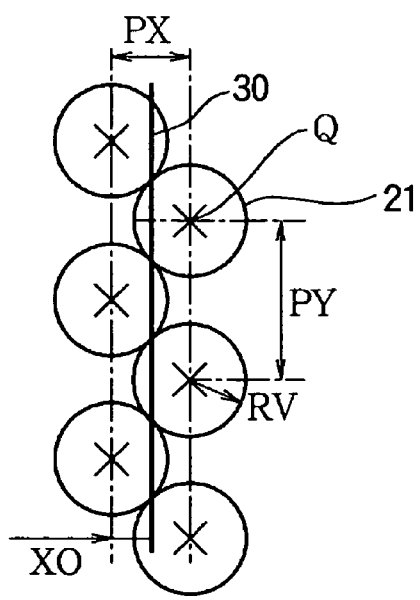
FIG. 10 is a plan view showing a viewing field of the microlenses according to Embodiment 1.

FIG. 10 shows the smallest radii RV of the viewing fields 21 of the microlenses 12 arranged in two rows in the case where each of the LED elements 30 is disposed in the viewing field 21 of at least one the microlens 12 of at least one of the two rows, and images of all of the LED elements 30 are formed on the surface of the photosensitive drum 41 via the microlenses 12 arranged in two rows. This is a case where the radii RV of the viewing fields 21 of the microlenses 21 are the smallest with which the lens array 1 operates. In this case, the radius RV of the viewing field 21 is expressed by the following equation (5):

$$RV = \sqrt{\left(\frac{PX}{2}\right)^2 + \left(\frac{PY}{4}\right)^2} \quad (5)$$

where PY represents the arranging interval of the microlenses 21 in the arranging direction of the microlenses 21, PX represents the interval between two rows of the microlenses 21 in the direction substantially perpendicular to the arranging direction of the microlenses 12.

From the equations (2) and (5), the operating condition for the lens array 1 is expressed as follows:

$$\sqrt{\left(\frac{PX}{2}\right)^2 + \left(\frac{PY}{4}\right)^2} \leq RA \times \frac{LO - FO}{FO} \quad (6)$$

In the case where the microlenses 12 are arranged in one line, the operating condition of the lens array 1 will be obtained by assigning 0 to XO (i.e., XO=0) in the equation (4).

Next, a decrease in resolution will be described with reference to FIGS. 11A, 11B, 12A and 12B.

FIGS. 11A and 11B show the first and second microlenses 12a and 12b with substantially aligned optical axes, the opening 13a of the light shielding member 13, and the light emitted by the LED element 30 at a distance RV from the optical axis 27. In FIG. 11A, the left-right direction is parallel to the arranging direction of the microlenses 12a, and the optical axis 27 extends in the above-below direction. In FIG. 11B, the left-right direction is perpendicular to the arranging direction of the microlenses 12a, and the optical axis 27 extends in the above-below direction. Further, the right side in FIG. 11B corresponds to the outer side of the lens array 1 in the widthwise direction. As shown in FIGS. 11A and 11B, the light is emitted by the LED element 30 disposed in the viewing field (RV) of the microlens 12.

As shown in FIG. 11A, a principal light ray 25 of the light emitted by the LED element 30 (disposed in the viewing field of the microlens 12) intersects the optical axis 27 at a first focal plane FP1-1, and is incident on the first microlens 12a. Further, the principal light ray 25 proceeds in a direction substantially parallel to the optical axis 27 passing the vicinity of the inner surface of the opening 13a, and is incident on the second microlens 12b. In this state, a peripheral light ray 26 of the light emitted by the LED element 30 is incident on the first microlens 12a, and forms an image EG in the vicinity of a position where the intermediate imaging plane MIP intersects the inner surface of the opening 13a. In this regard, as shown in FIG. 11B, the peripheral light ray 26 forms the image EG at a distance XI from the LED element 30 in the direction substantially perpendicular to the arranging direction of the microlenses 12 and perpendicular to the optical axis 27.

FIGS. 12A and 12B show the first and second microlenses 12a and 12b with substantially aligned optical axes, the opening 13a of the light shielding member 13, and the light emitted by the LED element 30 disposed at more than a distance RV from the optical axis 27 (i.e., out of the viewing field of the microlens 12a). In FIG. 12A, the left-right direction is parallel to the arranging direction of the microlenses 12a, and the optical axis 27 extends in the above-below direction. In FIG. 12B, the left-right direction is perpendicular to the arranging direction of the microlenses 12a, and the optical axis 27 extends in the above-below direction. Further, the right side in FIG. 12B corresponds to the outer side of the lens array 1 in the widthwise direction.

As shown in FIG. 12A, the peripheral light ray 26 of the light emitted by the LED element 30 disposed out of the viewing field (RV) of the microlens 12a is incident on the first microlens 12a, and forms the image EG on the inner surface of the opening 13a at a portion between the intermediate imaging plane MIP and the first microlens 12a. In this regard, as shown in FIG. 12B, the peripheral light ray 26 forms the image EG at the distance XI from the LED element 30 in the direction substantially perpendicular to the arranging direction of the microlenses 12 and perpendicular to the optical axis 27. The principal light ray 25 is blocked by the light shielding member 13.

In the conventional lens array, the light rays forming the image EG are reflected or scattered at the inner surface of the opening 13a, and are incident on the second microlens 12b to reach the imaging plane IP. Therefore, the amount of light incident on a position on the imaging plane IP other than the image of the LED element 30 increases, which generates a flare that causes a decrease in resolution of the lens array 1.

Next, the light absorbing portion 13b according to Embodiment 1 will be described. In Embodiment 1, the light absorbing portion 13b is formed entirely on the inner surface of each opening 13a of the light shielding member 13. The inventors have formed the lens arrays 1 whose light absorbing portions 13b have various arithmetic average roughness, and performed evaluations. As a result, when the arithmetic average roughness was greater than or equal to 2 μm, the flare (that causes a decrease in resolution) was sufficiently suppressed, and the resolution of the lens array 1 was enhanced. More specifically, when the arithmetic average roughness was in a range from 2 μm to 20 μm, the flare was particularly suppressed (i.e., the amount of light due to the flare was particularly reduced), and the resolution of the lens array 1 was remarkably enhanced.

The lens arrays 1 were manufactured, which have light absorbing portions 13b with various arithmetic average roughness as measured in the direction substantially parallel to the optical axes 27 of the microlenses 12. Evaluations were performed using the lens arrays 1. As a result, when the arithmetic average roughness was greater than 2 μm, a total light reflectance was less than or equal to 3% over an entire visible range. More specifically, when the arithmetic average roughness was in a range from 2 μm to 20 μm, a total light reflectance was less than or equal to 3% over an entire visible range. Therefore, it is understood that, when the total light reflectance is in a range from 0 to 3%, the reflection of the light rays forming the image EG (see FIGS. 12A, 12B) at the light absorbing portion 13b is suppressed. Thus, the flare that may cause a decrease in resolution is prevented. In this regard, the total light reflectance was measured as follows. First, a portion including the light absorbing portion 13b was cut out of the light shielding portion 13. Then, a lusterless paint was painted on surfaces of the portion except the light shielding portion 13b so that these painted surfaces do not reflect light. Then, the total light reflectance over the entire visible range was measured using spectrophotometer "CM 3700d" (manufactured by Konica-Minolta Inc.) in which a specimen surface was illuminated at an angle of 45 degrees.

Figure 13:
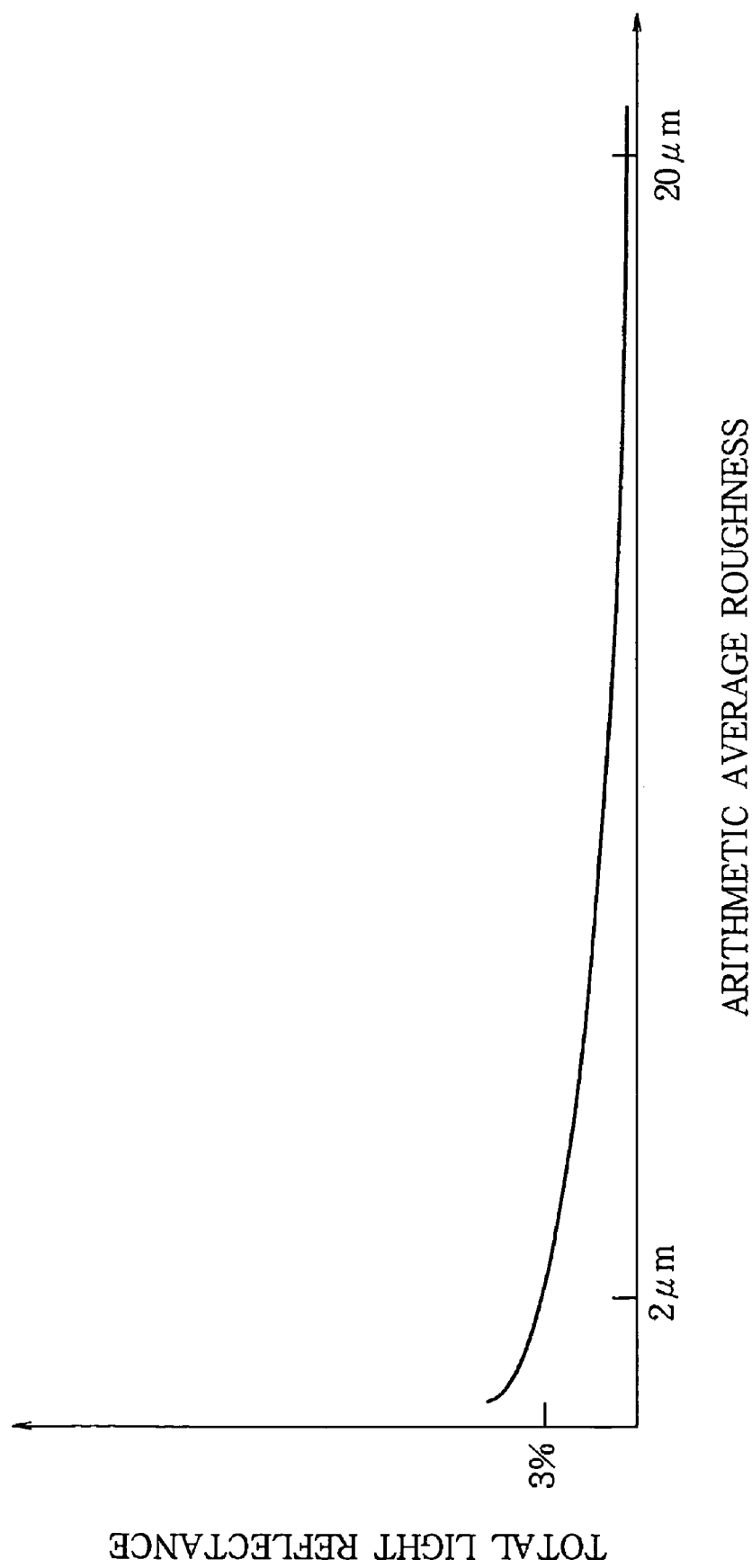
FIG. 13 shows a relationship between an arithmetic average roughness of a light absorbing portion and a total light reflectance over the entire visible range at the light absorbing portion.

FIG. 13 shows a relationship between the arithmetic average roughness of the light absorbing portion 13b and the total light reflectance over the entire visible range. FIG. 14 shows a relationship between the arithmetic average roughness of the light absorbing portion 13b and an MTF (Modulation Transfer Function) of the lens array 1. In this regard, the MTF indicates a resolution of the exposure device, i.e., a contrast of the image of the LED element 30 of the exposure device emitting the light. The MTF of 100% indicates that the imaging contrast is the highest, and that the exposure device has the highest resolution. The small MTF indicates that the imaging contrast is low, and that the exposure device has the low resolution.

The followings can be understood from FIGS. 13 and 14:

(A) When the arithmetic average roughness is less than 2 μm, the total light reflectance is greater than 3% and the MTF of the lens array 1 is less than 80%. Further, as the arithmetic average roughness decreases, the total light reflectance increases, and the MTF of the lens array decreases.

(B) When the arithmetic average roughness is in a range from 2 μm to 20 μm, the total light reflectance decreases and the MTF of the lens array increases, as the arithmetic average roughness increases.

(C) When the arithmetic average roughness is greater than 20 μm, the total light reflectance decreases and the MTF of the lens array increases, as the arithmetic average roughness increases. However, the light shielding member 13 having the light absorbing portions 13b whose arithmetic average roughness is greater than 20 μm can not be formed using the injection molding, since a material (for forming the light shielding member 13) does not flow in a metal mold. Further, the light absorbing portions 13b whose arithmetic average roughness is greater than 20 μm can not be formed by transferring a roughened surface formed on the metal mold, since the light shielding member 13 can not be separated from the metal mold due to a large release resistance. From the above described reasons (A) through (C), it is preferable that the arithmetic average roughness is in a range from 2 μm to 20 μm.

Generally, in a precise resin molding using an injection molding, a fluidity of the resin in the mold may decrease depending on amount and size of filler (additives). If the fluidity of the resin decreases, the resin may not flow into small portions of the metal mold, or may be largely deformed after the molding due to internal stress, so that the resin may not be molded into a correct shape. Further, there are cases where a molded resin may be broken by a slight deformation, depending on the amount and size of the filler.

In Embodiment 1, the glass fibers (as filler) each of which has a diameter in a range from 30 μm to 300 μm are added to the resin for forming the light shielding member 13, so that a sufficient fluidity is obtained in the injection molding process of the light shielding member 13, and the correct shapes of the openings 13a can be obtained. Further, the light shielding member 13 after molding is not brittle, but has a sufficient strength. Furthermore, a desired arithmetic average roughness can be obtained, and therefore the flare can be suppressed, i.e., the resolution of the lens array can be enhanced.

More specifically, by adding 10 to 100 weight parts of the glass fibers (as filler) to 100 weight parts of the resin for forming the light shielding member 13, a sufficient fluidity is obtained in the injection molding process of the light shielding member 13, and the correct shapes of the openings 13a can be obtained. Moreover, the light shielding member 13 after molding is not brittle, but has a sufficient strength. Furthermore, a desired arithmetic average roughness can be obtained, and the flare can be prevented, so that the resolution of the lens array can be enhanced. Moreover, by adding the same amount of carbon fibers or resin filler having the same shape and size as the above described glass fibers, the same advantages can be obtained.

Furthermore, by forming the concaves and convexes on a surface of the metal mold (for forming the light shielding member 13) corresponding to the inner surfaces of the opening 13a in a grinding process of the metal mold, the roughened surfaces can be formed on the inner surfaces of the opening 13a. When the arithmetic average roughness of the inner surfaces of the openings 13a is greater than or equal to 2 μm as measured in the direction substantially parallel to the optical axes, the flare (that causes a decrease in resolution) can be sufficiently suppressed, and the lens array 1 having high resolution can be obtained. More specifically, when the arithmetic average roughness of the inner surfaces of the openings 13a is in a range from 2 μm to 20 μm, the flare can be particularly suppressed, and the lens array 1 having remarkably high resolution can be obtained.

Figure 15A:
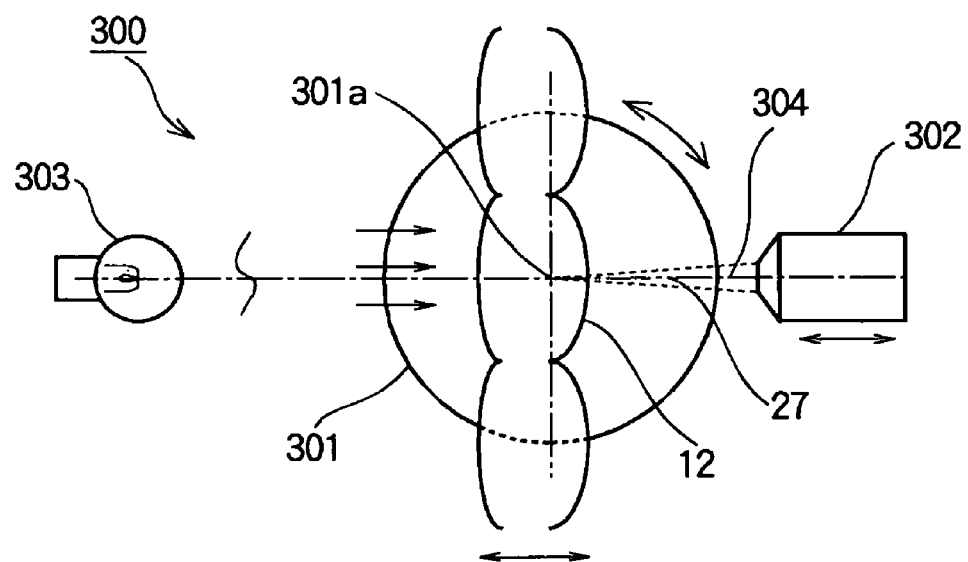
FIGS. 15A and 15B are schematic views for illustrating a measuring system for measuring a focal length.
Figure 15B:
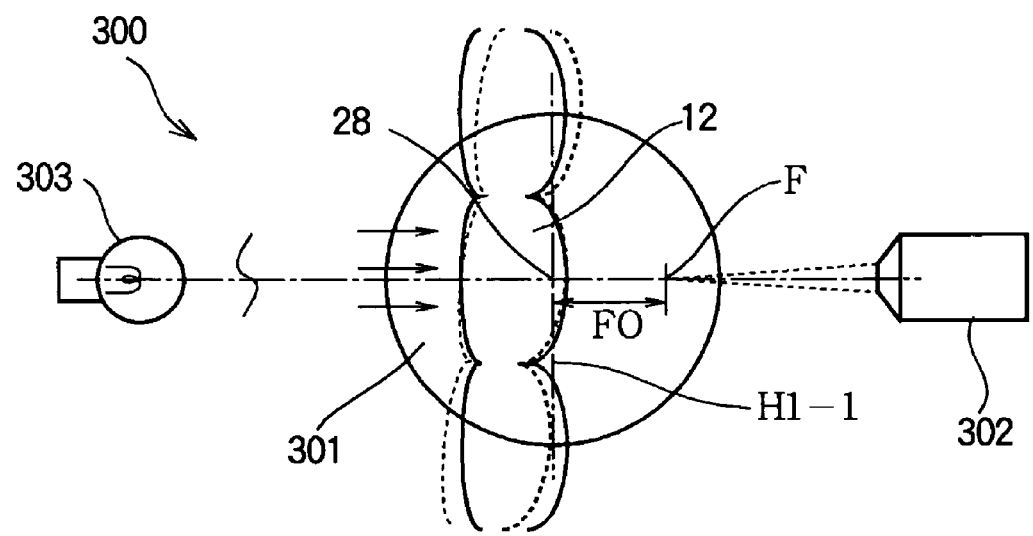

Next, a method for measuring the focal length FO of the microlens 12 will be described. FIGS. 15A and 15B show a measuring system 300 for measuring focal length using a nodal slide method. The measuring system 300 includes a turntable 301, a microscope 302 and a light source 303. The turntable 301 is rotatable by a small angle. A rotation center 301a of the turntable 301 is disposed on an optical axis 304 of the microscope 302. The turntable 301 is able to move the microlens 12 (as a specimen) in the direction of the optical axis 304. The light source 303 is disposed on the opposite side to the microscope 302 with respect to the turntable 301, and on the optical axis 304 of the microscope 302. The light source 303 emits substantially parallel light toward the turntable 301.

On the measurement of the focal length FO of the microlens 12, the object plane of the microscope 302 is aligned on the rotation center 301a of the turntable 301, as shown in FIG. 15A. The microlens 12 is placed on the turntable 301 in such a manner that the optical axis 27 of the microlens 12 is substantially aligned with the optical axis 304 of the microscope 302. By moving the object plane of the microscope 302 away from the light source 303, the light emitted by the light source 303 is collected by the microlens 12 and forms a light spot on the object plane. The object plane of the microscope 302 and the microlens 12 are moved respectively along the optical axes so as to find a position where the diameter of the light spot formed on the object plane of the microscope 302 by the microlens 12 is the smallest, and where the spot diameter is not varied by the rotation of the turntable 301 by a small angle.

When the diameter of the light spot on the object plane of the microscope 302 formed by the microlens 12 is the smallest, and when the spot diameter is not varied by the rotation of the turntable 301 by a small angle (FIG. 15B), the rotation center 301a of the turntable 301 is substantially aligned with a principal point 28 of the microlens 12, i.e., a node (an intersecting point) of the first principal plane H1-1 of the microlens 12 and the optical axis 27. Further, a position of the object plane of the microscope 302 is the focal point F of the microlens 12. Therefore, the focal length FO of the microlens 12 is determined based on a distance from the rotation center 301a of the turntable 301 and the object plane of the microscope 302.

Next, using the LED head according to Embodiment 1, the MTF (indicating the resolution of the exposed image) was measured. As a result of the measurement, the MTF was greater than or equal to 80%. In this regard, when the maximum light intensity of the exposed image is expressed as EMAX, and the minimum light intensity of the adjacent two exposed images is expressed as EMIN, the MTF is defined as the following equation (7):

$$\text{MTF} = \{(E\text{MAX} - E\text{MIN})/(E\text{MAX} + E\text{MIN})\} \times 100(\%) \quad (7)$$

On the measurement of the MTF, the exposed image at a distance LI (mm) from the end surface of the lens array 1 on the imaging plane side (i.e., the photosensitive drum 41 side) was taken by a microscopic digital camera. From the taken image, the distribution of the light intensity of the image of the LED element 30 was analyzed, and the above described MTF was calculated. Further, the LED head 3 having the LED elements 30 whose arranging interval PD is 0.0423 mm (PD=0.0423 mm) was used. The resolution of the LED head 3 was 600 dpi, i.e., 600 LED elements 30 are arranged per inch (1 inch is approximately 25.4 mm). The lens array 1 according to Embodiment 1 is mounted to the LED head 3, and the LED elements 30 are alternately activated to emit light.

Figure 16:
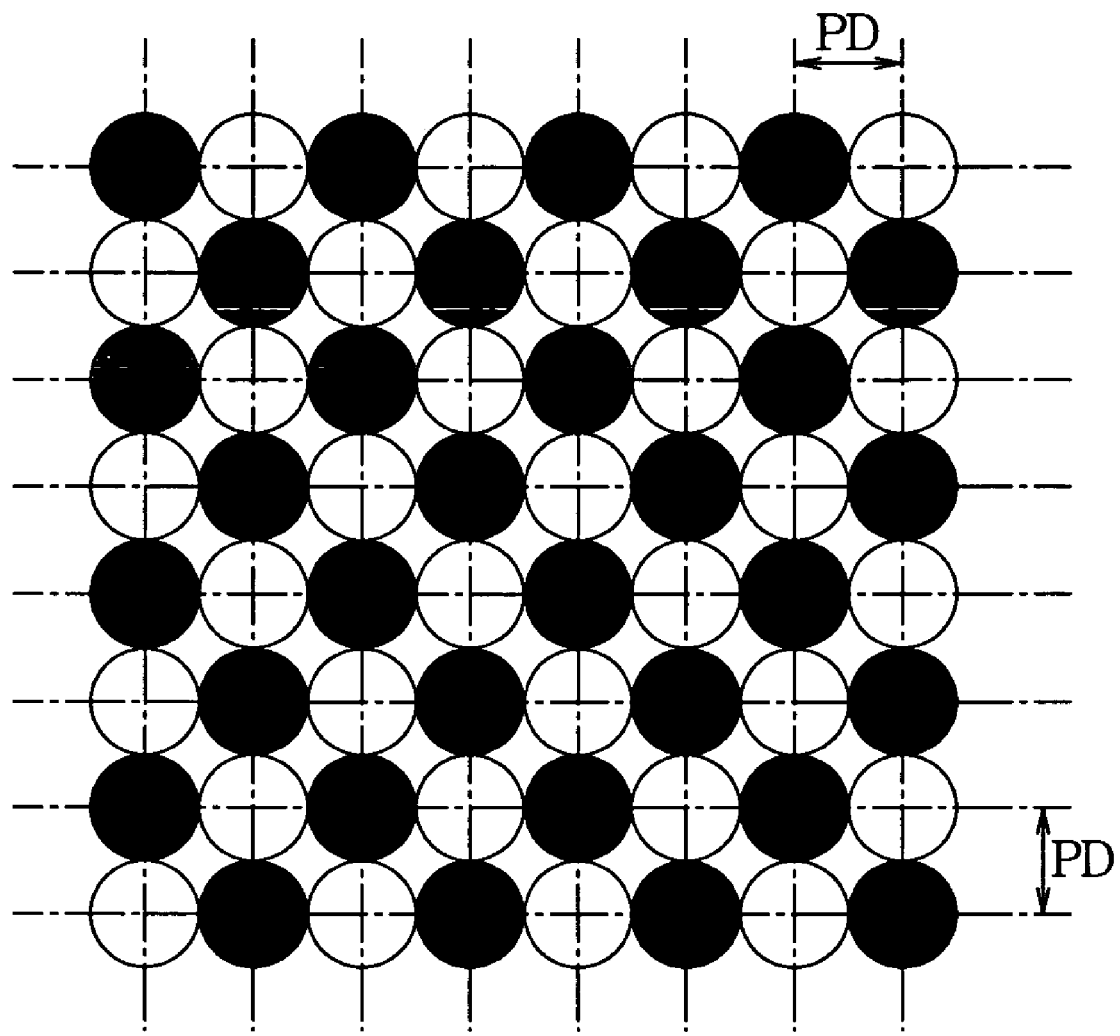
FIG. 16 is a schematic view for illustrating a print pattern used for evaluation tests.

Next, images were formed by the color electrophotographic printer 100 using the lens array according to Embodiment 1, and the images were evaluated. More specifically, dots were formed on alternate pixels throughout the printable area as shown in FIG. 16 using the color electrophotographic printer 100, and the image quality was checked. In FIG. 16, black dots indicate printed dots, and white dots indicate non-printed dots. As a result of evaluation, excellent images with no stripes or density irregularity were obtained.

When the MTF was greater than or equal to 80%, excellent images with no stripes or density irregularity were formed. However, when the MTF was less than 80%, images were not excellent. The reason is considered as follows. In a latent image, an electrical potential must be sufficiently high at a portion where the toner is to be absent. Such a portion must be sufficiently dark in the exposed image formed by the LED head. However, if the MTF is less than 80%, the light may be incident on the portion that must be sufficiently dark. In the latent image, the electrical potential of the portion where electrical potential must be high may decrease. Therefore, the toner may adhere to the portion where the toner is to be absent.

In Embodiment 1, the microlens 12 has a rotationally asymmetric high order aspheric surface. However, the shape of the microlens 12 is not limited to such a shape. For example, the microlens 12 can have a curved surface such as an anamorphic aspheric surface, a paraboloidal surface, an elliptical surface, a hyperboloidal surface or a conic surface. Further, in Embodiment 1, the shapes of the lens plates 11a and 11b are obtained by transferring the shapes of the metal mold to the resin. However, the shapes of the lens plates 11a and 11b can be formed using a resin mold, or can be formed by cutting. Furthermore, although the lens plates 11a and 11b are composed of resin, the lens plates 11a and 11b can be formed of glass. Furthermore, although the light absorbing portion 13b has the total light reflectance in a range from 0 to 3% over the entire visible range in Embodiment 1, it is also possible that the light absorbing portion 13b has the light reflectance in a range of 0 to 3% to a light emitted by the light source.

The measuring system for measuring the focal length FO is not limited to that using the nodal slide method. Further, it is also possible to measure other numerical value that can be converted into focal length. Moreover, although the light shielding member 13 is composed of PPS in Embodiment 1, the light shielding member 13 can be composed of other material. Furthermore, although the light shielding member 13 is formed using the injection molding, the light shielding member 13 can be formed using other resin molding method, cutting operation or chemical etching. Additionally, the light absorbing portion 13b can be formed of a covering layer formed of coating or plating composed of material that absorbs light. In stead of the LED array including a plurality of LED elements 30, it is also possible to use a light emitting portion including organic EL (electroluminescence) elements or semiconductor laser elements. It is also possible to use a fluorescent, a halogen lamp or the like together with shutter elements composed of LED elements.

As described above, according to Embodiment 1, since the light absorbing portions 13b are provided in the openings 13a of the light shielding member 13, it becomes possible to prevent the flare (i.e., the phenomenon that the light from the light source reaches the imaging plane without being collected). Therefore, the resolution of the lens array 1 can be enhanced.

Moreover, the lens array 1 can form an image with sufficient contrast, and the image forming apparatus (i.e., the electrophotographic printer 100) using the lens array 1 can form an excellent image without stripes or density irregularity.

Embodiment 2

Figure 17:
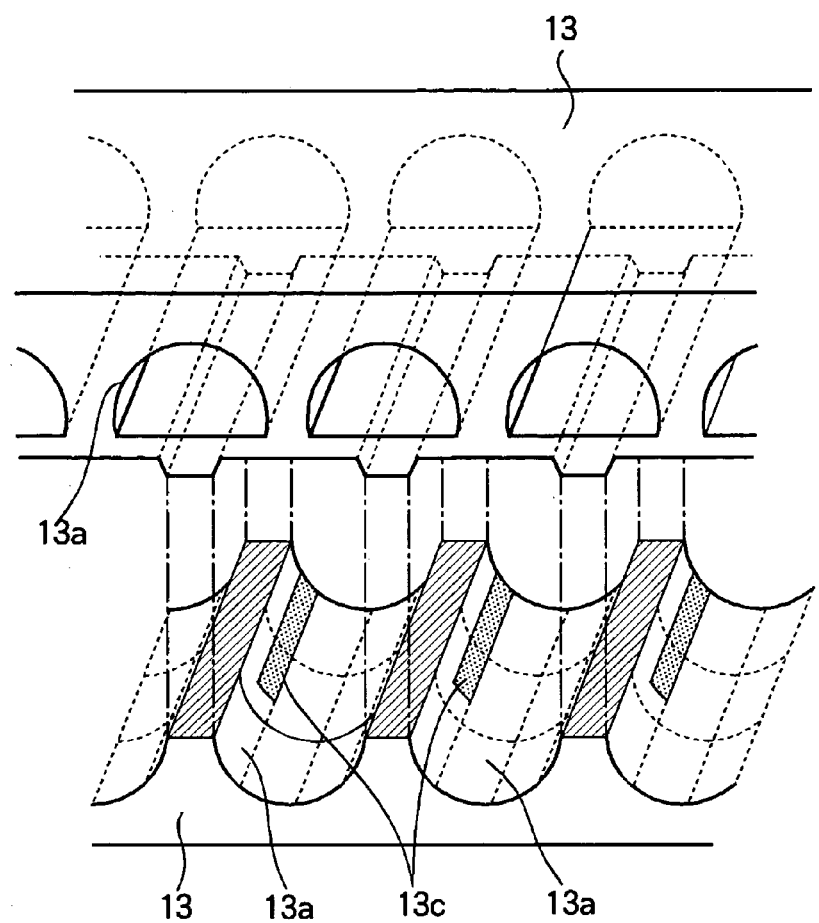
FIG. 17 is an exploded perspective view showing a light shielding member of a lens array according to Embodiment 2 of the present invention.

Next, Embodiment 2 of the present invention will be described. In Embodiment 2, the light absorbing portion is formed on a part of the inner surface of each opening 13a. FIG. 17 is an exploded perspective view showing the light shielding member 13 of the lens array according to Embodiment 2. In FIG. 17, the light shielding member 13 is divided at a plane parallel to axes of the cylindrical portions of the openings 13a. Shapes and positions of the light shielding portions 13c formed on parts of the inner surfaces of the openings 13a are shown in FIG. 17. The light absorbing portions 13c have substantially band shapes which are substantially parallel to the cylindrical portions of the openings 13a, i.e., substantially parallel to the optical axes of the microlenses 12.

Figure 18:
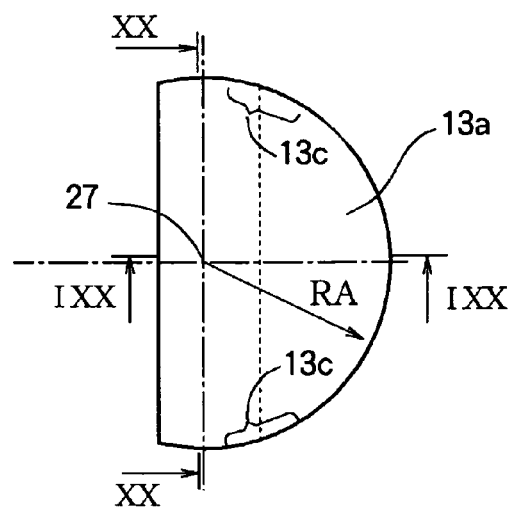
FIG. 18 is a plan view showing an opening of the light shielding member according to Embodiment 2.

FIG. 18 is a plan view showing the opening 13a formed on the light shielding portion 13 according to Embodiment 2. The arranging direction of the openings 13a is the above-below direction in FIG. 18. The openings 13a are arranged in the left-right direction in FIG. 18 in two rows. The optical axes 27 of the microlenses 12 are perpendicular to the sheet of FIG. 18. Two light absorbing portions 13c are provided on two positions on the inner surface of the opening 13a in such a manner that the light absorbing portions 13c face each other in the arranging direction of the openings 13a.

Figure 19:
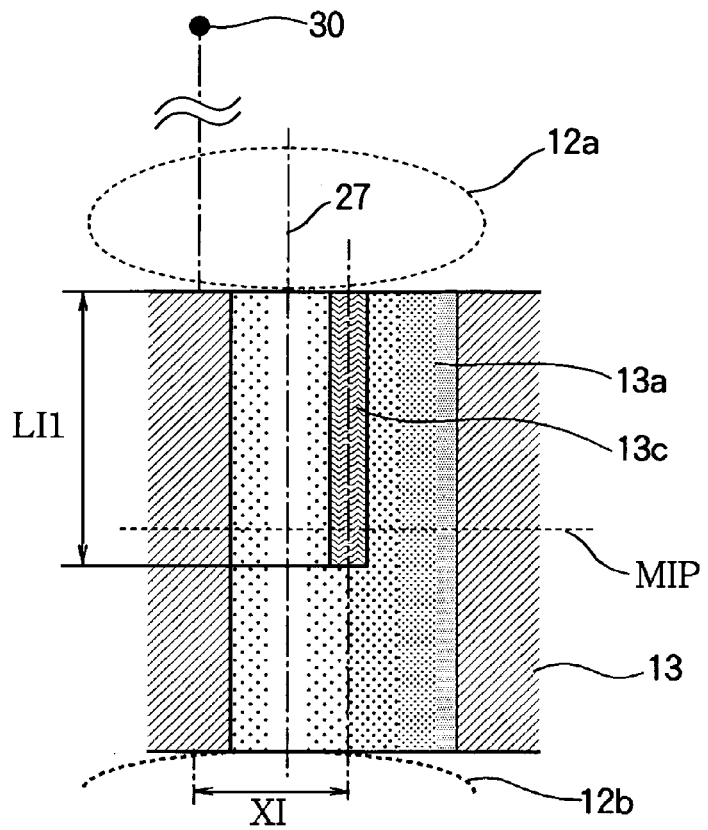
FIG. 19 is a sectional view taken along line IXX-IXX in FIG. 18.
Figure 20:
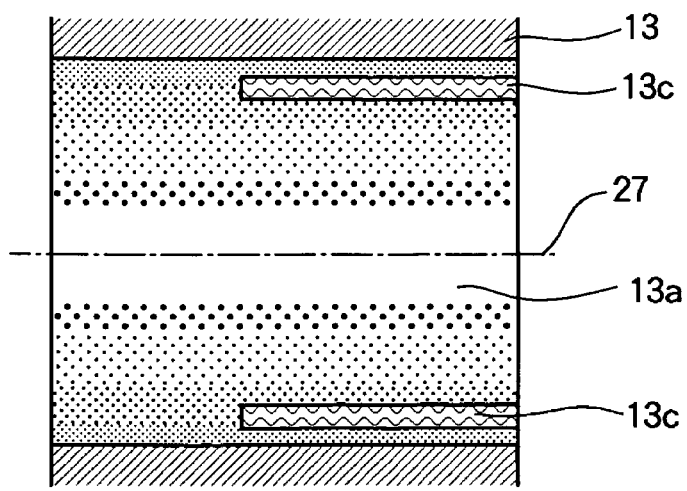
FIG. 20 is a sectional view taken along line XX-XX in FIG. 18.

FIG. 19 is a sectional view taken along Line IXX-IXX in FIG. 18. FIG. 20 is a sectional view taken along Line XX-XX in FIG. 18. As shown in FIGS. 19 and 20, the light absorbing portion 13c of Embodiment 2 extends in the direction of the optical axis 27 of the microlenses 12a and 12b. More specifically, the light absorbing portion 13c extends from the end of the opening 13a on the first microlens 12a side to somewhat beyond the intermediate imaging plane MIP. The light absorbing portion 13c is disposed at a distance XI from the LED element 30 in the direction perpendicular to the optical axis 27. The light shielding member 13 of Embodiment 2 is formed of resin using the injection molding. The light absorbing portion 13c is formed by roughening a part of the inner surface of the opening 13a, more specifically, by forming a roughened surface on a part of the metal mold and by transferring the roughened surface of the metal mold to the resin.

In Embodiment 2, the microlenses 12 (12a, 12b) have the same configurations as those of Embodiment 1.

Further, the operation of the lens array according to Embodiment 2 is the same as the operation of the lens array according to Embodiment 1.

Here, a position where the light absorbing portion 13c of Embodiment 2 is provided will be described with reference to FIG. 11 of Embodiment 1.

As shown in FIG. 11B, the principal light ray 25 of the light emitted by the LED element 30 intersects the optical axis 27 at the first focal plane FP1-1, is incident on the first microlens 12a, proceeds substantially parallel to the optical axis 27 passing the vicinity of the inner surface of the opening 13a, and is incident on the second microlens 12b. In this state, the peripheral light ray 26 of the light emitted by the LED element 30 intersects the optical axis 27 at the first focal plane FP1-1, is incident on the first microlens 12a, and forms the image EG of the LED element 30 at the portion where the intermediate imaging plane MIP intersects the inner surface of the opening 13a and at the distance XI from the LED element 30 in the direction substantially perpendicular to the arranging direction of the microlenses 12 and perpendicular to the optical axis 27 of the microlens 12.

From FIG. 11B, based on the similarity relationship of the figure (two triangles) formed by the principal light ray 25, the optical axis 27 and the object plane OP and the first principal plane H1-1, and based on the relationship SO≈LO, the following equation (8) is obtained:

$$XI = \frac{LO}{LO-FO} \times XO \quad (8)$$

In this regard, considering that the image EG is formed as a spot which is larger than the object (the LED element 30), the light absorbing portion 13c preferably has a band shape having a width. Therefore, the position where the light absorbing portion 13c is to be disposed is expressed as the following relationship (9):

$$0.8 \times \frac{LO}{LO-FO} \times XO \leq XI \leq 1.2 \times \frac{LO}{LO-FO} \times XO \quad (9)$$

Further, in the case where the microlenses 12 of the lens array 1 are arranged in two rows, the relationship XO=PX/2 is obtained from FIG. 10. By assigning PX/2 to XO in the relationship (9), the following relationship (10) is obtained.

$$0.4 \times \frac{LO}{LO-FO} \times PX \leq XI \leq 0.6 \times \frac{LO}{LO-FO} \times PX \quad (10)$$

Generally, when the surface of the metal mold is roughened and the injection molding is performed, a release resistance between a molded article and the surface of the metal mold becomes large when the molded article is taken out of the mold. In such a case, the shape of the metal mold is not correctly transferred to the molded article, or the molded article is not taken out of the mold. However, according to Embodiment 2, areas for forming the light absorbing portions 13c can be limited to small areas. Therefore, areas on the surface of the metal mold where surfaces are to be roughened can be limited to small areas. Therefore, the light shielding member 13 can be formed to a correct shape.

The light absorbing portion 13c can also be formed of a light absorbing layer formed by coating, plating or depositing of a material that absorbs light. In Embodiment 2, the areas where the light absorbing portions 13c are to be formed are limited to small areas, and therefore the light absorbing portion 13c can be efficiently formed.

As described above, according to Embodiment 2, it becomes possible to prevent the flare (i.e., the phenomenon that the light from the light source reaches the imaging plane without being collected), and therefore the resolution can be enhanced as described in Embodiment 1. Furthermore, the areas where the light absorbing portions 13c are to be formed are limited to small areas, and therefore the light absorbing portions 13c can be efficiently formed. Thus, productivity of the lens array can be enhanced.

Embodiment 3

Figure 21:
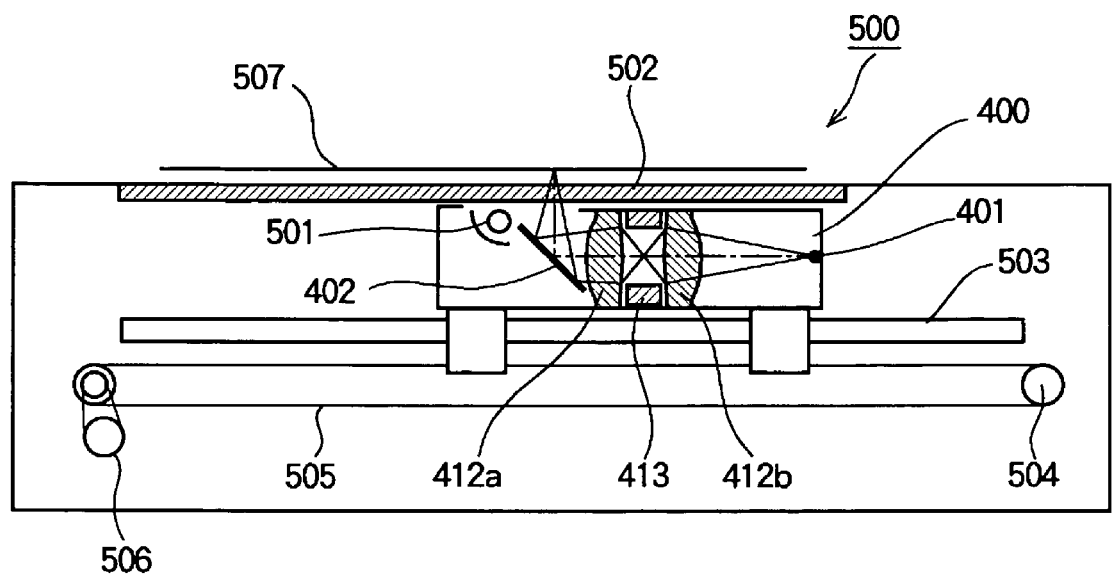
FIG. 21 schematically shows a reading apparatus according to Embodiment 3.

Next, Embodiment 3 of the present invention will be described. Embodiment 3 relates to a reading apparatus employing the lens array according to Embodiment 1 or 2. FIG. 21 is a schematic view showing a configuration of the reading apparatus employing the lens array according to Embodiment 1 or 2.

In FIG. 21, a numeral 500 indicates a scanner as a reading apparatus that generates electric data of a manuscript. The scanner 500 includes a reading head 400, a manuscript table 502, rails 503, pulleys 504, a driving belt 505 and a motor 506. The reading head 400 takes in the lights reflected by the surface of the manuscript 507, and converts the images into the electric data. The reading head 400 is movably provided on the rail 503. The manuscript 507 is placed on the manuscript table 502. The manuscript table 502 is formed of a material that transmits a visible light. The reading head 400 is provided with a lamp 501 as an illumination unit. The light emitted by the lamp 501 is reflected by the surface of the manuscript 507, and is incident on the reading head 400. The driving belt 505 is stretched around a plurality of pulleys 504. A part of the driving belt 505 is connected to a part of the reading head 400. The driving belt 505 is driven by the motor 506, and moves the reading head 400.

Figure 22:
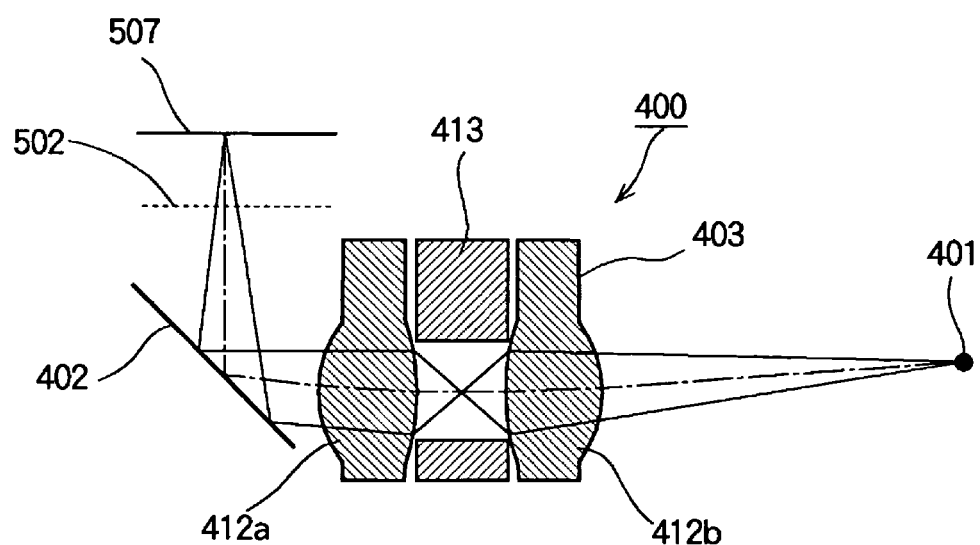
FIG. 22 is a sectional view showing a configuration of a reading head of the reading apparatus according to Embodiment 3.

Next, a configuration of the reading head 400 will be described with reference to FIG. 22. FIG. 22 shows the configuration of the reading head 400. In FIG. 22, a numeral 402 indicates a mirror that bends a light path of the light reflected by the manuscript 507. The reading head 400 includes a lens array 403 that forms an image of the manuscript 507. The LED head 400 further includes a line sensor 401 including a plurality of light receiving elements which are linearly arranged at predetermined intervals PR. The line sensor 401 converts images of the manuscript (formed by the lens array 403) into electric signals. The lens array 403 includes microlenses 412a and 412b and a light shielding member 413 disposed therebetween.

Figure 23:
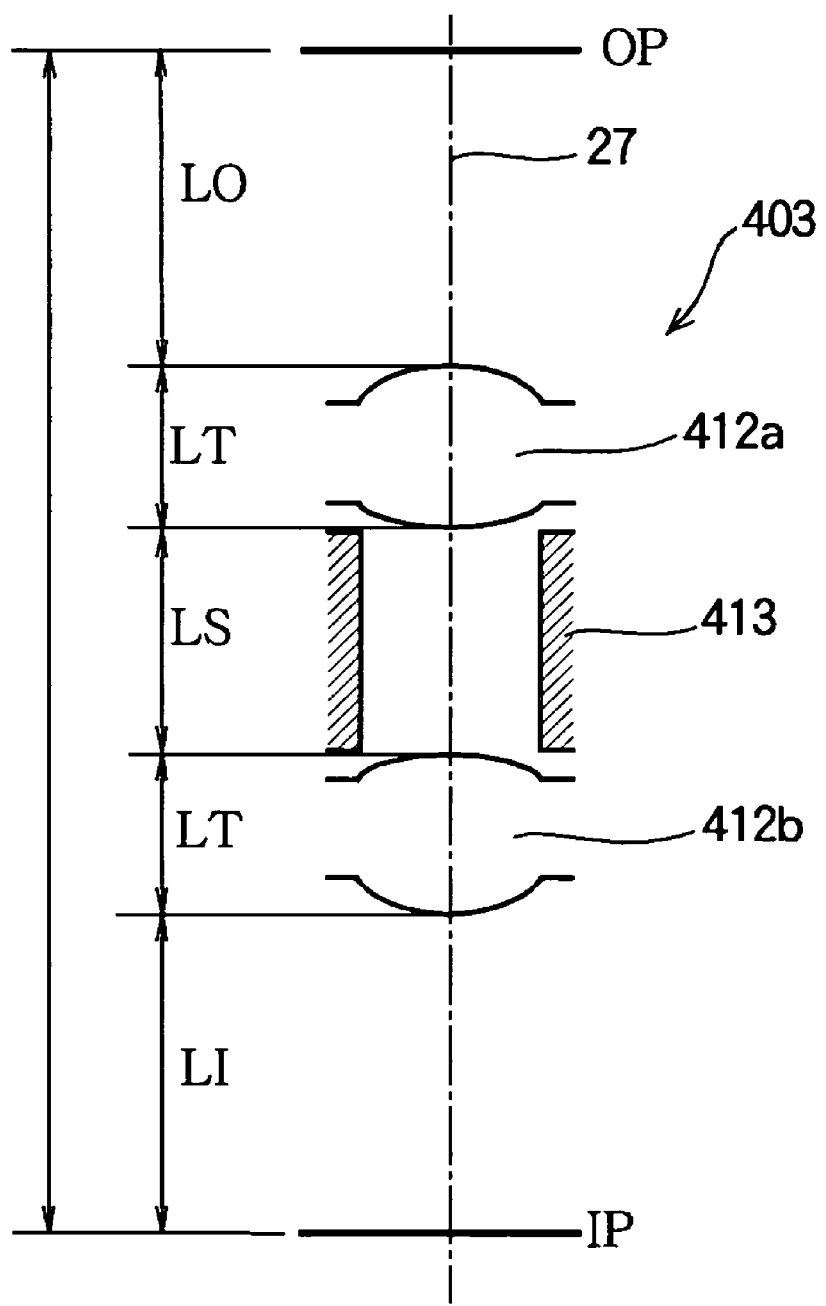
FIG. 23 shows a relationship between an object (i.e., a manuscript) and the reading head of the reading apparatus according to Embodiment 3.

FIG. 23 shows an arrangement of the reading head 400 and the object plane OP (i.e., the surface of the manuscript 507) according to Embodiment 3. The configuration of the lens array 403 is the same as the lens array 1 according to Embodiment 1 or 2. In Embodiment 3, the line sensor 401 has a resolution of 600 dpi, i.e., 600 light receiving elements are arranged per inch (1 inch is approximately 25.4 mm). In other words, the interval PR between the light receiving elements is 0.0423 mm.

Next, an operation according to Embodiment 3 will be described. In FIG. 21, when the lamp 501 is turned on, the surface of the manuscript 507 is exposed with the light. The light reflected by the surface of the manuscript 507 is taken in by the reading head 400. The motor 506 drives the driving belt 505, and the reading head 400 with the lamp 501 moves in the left-right direction in FIG. 21. The reading head 400 takes in the light reflected by the surface of the manuscript 507.

Next, an operation of the reading head 400 will be described with reference to FIG. 22. The light reflected by the manuscript 507 passes the manuscript table 502, is reflected by the mirror 402, and is incident on the lens array 403. The lens array 403 forms the image of the manuscript 507 on the line sensor 401. The line sensor 401 converts the image of the manuscript 507 into electric signals.

Using the scanner 500 of Embodiment 3, image data was formed from the manuscript 507. The manuscript 507 had a pattern of FIG. 16 corresponding to 600 dpi in which dots were alternately formed on pixels arranged at the intervals PD of 0.0423 mm on the entire printable area of a media (i.e., a sheet of the manuscript 507). As a result, an excellent image data which was the same as the manuscript 507 was obtained.

In Embodiment 3, the scanner that converts the image of the manuscript into electric data has been described as an example of the reading apparatus. However, Embodiment 3 is applicable to sensors or switches that convert optical signal into electric data, and is also applicable to input-output systems, biometrical identification systems, communication systems or dimension measuring systems using such sensors or switches. By employing the lens array according to Embodiment 3, the image of the manuscript can be formed with sufficient brightness and contrast, and sufficient focal depth can be obtained. Further, using the reading apparatus according to Embodiment 3, the image data which is the same as the manuscript image can be obtained.

While the preferred embodiments of the present invention have been illustrated in detail, it should be apparent that modifications and improvements may be made to the invention without departing from the spirit and scope of the invention as described in the following claims.

What is claimed is:

1. A lens array comprising:
a plurality of lens units each of which includes a plurality of microlenses which are linearly arranged, and
a light shielding member having a plurality of openings as apertures, said openings being disposed so as to face said microlenses of respective lens units,
wherein facing microlenses of said lens units have optical axes substantially aligned with each other and passing said openings of said light shielding member,
wherein light absorbing portions are provided in said openings, and
wherein said light absorbing portions are formed partially on inner surfaces of said openings of said light shielding member.

2. The lens array according to claim 1, wherein said light absorbing portions have substantially band shapes extending in a direction substantially parallel to said optical axes of said microlenses.

3. The lens array according to claim 1, wherein FO represents a focal length of said microlens, LO represents a distance from said microlens to a surface of an object, XO represents a distance from said object to said optical axis of said microlens in a direction substantially perpendicular to an arranging direction of said microlenses and also perpendicular to said optical axis, and XI represents a distance from said object to said light absorbing portion in a direction substantially perpendicular to said arranging direction of said microlenses and also perpendicular to said optical axis, and
wherein the following relationship is satisfied:

$$0.8 \times \frac{LO}{LO-FO} \times XO \leq XI \leq 1.2 \times \frac{LO}{LO-FO} \times XO.$$

4. The lens array according to claim 1, wherein said microlenses are arranged in two rows, and said two rows are disposed with an interval PX in a direction substantially perpendicular to said optical axes of said microlenses,
wherein FO represents a focal length of said microlens, LO represents a distance from said microlens to a surface of an object, and XI represents a distance from said object to said light absorbing portion in a direction substantially perpendicular to an arranging direction of said microlenses and also perpendicular to said optical axes, and wherein the following relationship is satisfied:

$$0.4 \times \frac{LO}{LO-FO} \times PX \leq XI \leq 0.6 \times \frac{LO}{LO-FO} \times PX.$$

5. An exposure device comprising said lens array according to claim 1.

6. An LED head comprising said lens array according to claim 1.

7. An image forming apparatus comprising said lens array according to claim 1.

8. A reading apparatus comprising said lens array according to claim 1.

9. A lens array, comprising:
a plurality of lens units each of which includes a plurality of microlenses which are linearly arranged, and
a light shielding member having a plurality of openings as apertures, said openings being disposed so as to face said microlenses of respective lens units,
wherein facing microlenses of said lens units have optical axes substantially aligned with each other and passing said openings of said light shielding member,
wherein light absorbing portions are provided in said openings, and
wherein said light absorbing portions have an arithmetic average roughness greater than or equal to 2 µm as measured in a direction parallel to said optical axes.

10. An exposure device comprising said lens array according to claim 9.

11. An LED head comprising said lens array according to claim 9.

12. An image forming apparatus comprising said lens array according to claim 9.

13. A reading apparatus comprising said lens array according to claim 9.

14. A lens array, comprising:
a plurality of lens units each of which includes a plurality of microlenses which are linearly arranged, and
a light shielding member having a plurality of openings as apertures, said openings being disposed so as to face said microlenses of respective lens units,
wherein facing microlenses of said lens units have optical axes substantially aligned with each other and passing said openings of said light shielding member,
wherein light absorbing portions are provided in said openings, and
wherein said light absorbing portions have an arithmetic average roughness in a range from 2 µm to 20 µm as measured in a direction parallel to said optical axes.

15. An exposure device comprising said lens array according to claim 14.

16. An LED head comprising said lens array according to claim 14.

17. An image forming apparatus comprising said lens array according to claim 14.

18. A reading apparatus comprising said lens array according to claim 14.

19. A lens array, comprising:
a plurality of lens units each of which includes a plurality of microlenses which are linearly arranged, and
a light shielding member having a plurality of openings as apertures, said openings being disposed so as to face said microlenses of respective lens units, wherein facing microlenses of said lens units have optical axes substantially aligned with each other and passing said openings of said light shielding member, wherein light absorbing portions are provided in said openings, and wherein said light shielding member is composed of a resin to which filler is added.

20. The lens array according to claim 19, wherein said filler has a size in a range from 30 μm to 300 μm.

21. The lens array according to claim 19, wherein 10 to 100 weight parts of said filler is added to 100 weight parts of said resin.

22. An exposure device comprising said lens array according to claim 19.

23. An LED head comprising said lens array according to claim 19.

24. An image forming apparatus comprising said lens array according to claim 19.

25. A reading apparatus comprising said lens array according to claim 19.

26. A lens array, comprising:
a plurality of lens units each of which includes a plurality of microlenses which are linearly arranged, and
a light shielding member having a plurality of openings as apertures, said openings being disposed so as to face said microlenses of respective lens units,
wherein facing microlenses of said lens units have optical axes substantially aligned with each other and passing said openings of said light shielding member,
wherein light absorbing portions are provided in said openings, and
wherein said light absorbing portions have shapes transferred from a mold having roughened surfaces.

27. An exposure device comprising said lens array according to claim 26.

28. An LED head comprising said lens array according to claim 26.

29. An image forming apparatus comprising said lens array according to claim 26.

30. A reading apparatus comprising said lens array according to claim 26.

31. A lens array, comprising:
a plurality of lens units each of which includes a plurality of microlenses which are linearly arranged, and
a light shielding member having a plurality of openings as apertures, said openings being disposed so as to face said microlenses of respective lens units,
wherein facing microlenses of said lens units have optical axes substantially aligned with each other and passing said openings of said light shielding member,
wherein light absorbing portions are provided in said openings, and
wherein said light absorbing portions are composed of covering layers made of material that absorbs light.

32. An exposure device comprising said lens array according to claim 31.

33. An LED head comprising said lens array according to claim 31.

34. An image forming apparatus comprising said lens array according to claim 31.

35. A reading apparatus comprising said lens array according to claim 31.

36. A lens array, comprising:
a plurality of lens units each of which includes a plurality of microlenses which are linearly arranged, and
a light shielding member having a plurality of openings as apertures, said openings being disposed so as to face said microlenses of respective lens units,
wherein facing microlenses of said lens units have optical axes substantially aligned with each other and passing said openings of said light shielding member,
wherein light absorbing portions are provided in said openings, and
wherein said microlenses of each lens unit are arranged so as to form a plurality of lens rows,
wherein PY represents an arranging interval of said microlenses in each of said lens row, and PX represents an interval between said lens rows, and
wherein PX<PY is satisfied.

37. An exposure device comprising said lens array according to claim 36.

38. An LED head comprising said lens array according to claim 36.

39. An image forming apparatus comprising said lens array according to claim 36.

40. A reading apparatus comprising said lens array according to claim 36.

41. A lens array, comprising:
a plurality of lens units each of which includes a plurality of microlenses which are linearly arranged, and
a light shielding member having a plurality of openings as apertures, said openings being disposed so as to face said microlenses of respective lens units,
wherein facing microlenses of said lens units have optical axes substantially aligned with each other and passing said openings of said light shielding member,
wherein light absorbing portions are provided in said openings, and
wherein PN represents a distance between optical axes of adjacent microlenses, and RL represents a largest distance from said optical axis to a periphery of said microlens,
wherein RL>PN/2 is satisfied.

42. An exposure device comprising said lens array according to claim 41.

43. An LED head comprising said lens array according to claim 41.

44. An image forming apparatus comprising said lens array according to claim 41.

45. A reading apparatus comprising said lens array according to claim 41.

* * * * *